United States Patent
DiFranco et al.

(10) Patent No.: US 10,909,186 B2
(45) Date of Patent: Feb. 2, 2021

(54) MULTI-TENANT CUSTOMIZABLE COMPOSITES

(71) Applicant: Oracle International Corporation, Redwood Shores, CA (US)

(72) Inventors: David Edward DiFranco, Webster Groves, MO (US); Aninda Sengupta, Redwood City, CA (US); Sherry Weng, Arcadia, CA (US); Michelle Lin, Fremont, CA (US); Gigi Lee, Fremont, CA (US)

(73) Assignee: ORACLE INTERNATIONAL CORPORATION, Redwood Shores (CA)

( * ) Notice: Subject to any disclaimer, the term of this patent is extended or adjusted under 35 U.S.C. 154(b) by 367 days.

(21) Appl. No.: 15/268,387

(22) Filed: Sep. 16, 2016

(65) Prior Publication Data

US 2017/0091231 A1    Mar. 30, 2017

Related U.S. Application Data

(60) Provisional application No. 62/235,313, filed on Sep. 30, 2015.

(51) Int. Cl.
*G06F 16/93*    (2019.01)
*G06F 16/21*    (2019.01)
*G06F 16/951*   (2019.01)

(52) U.S. Cl.
CPC .............. *G06F 16/93* (2019.01); *G06F 16/21* (2019.01); *G06F 16/211* (2019.01); *G06F 16/951* (2019.01)

(58) Field of Classification Search
CPC ......... G06F 17/30011; G06F 17/30289; G06F 17/30292; G06F 17/30864; G06F 16/93; G06F 16/21; G06F 16/211; G06F 16/951
See application file for complete search history.

(56) References Cited

U.S. PATENT DOCUMENTS 5,790,778 A    8/1998 Bush et al.
5,850,518 A    12/1998 Northrup
(Continued)

OTHER PUBLICATIONS

AJAX & Security: Vulnerability in DWR Security Logic Identified Can Potentially be exploited to launce DoS attacks and break into back-end servers, AjaxWorld™ Magazine, downloaded on Oct. 6, 2008 from http:/lajax.sys-con.com/node/319868, Jan. 8, 2007, 4 pages.

(Continued)

*Primary Examiner* — Kris E Mackes
*Assistant Examiner* — Tiffany Thuy Bui
(74) *Attorney, Agent, or Firm* — Kilpatrick Townsend & Stockton LLP

(57) ABSTRACT

Systems and methods for supporting multi-tenancy in a multi-tenant application server environment are provided. A first partition in a multi-tenant server environment can include a first composite and the first composite includes first metadata that is configured to be customized for a first tenant of the first partition. A second partition in the multi-tenant server environment can include a second composite and the second composite includes second metadata that is configured to be customized for a second tenant of the second partition. A global runtime in the multi-tenant server environment can include a global composite and the global composite include global metadata that is configured to be shared by the first partition and the second partition.

17 Claims, 9 Drawing Sheets

(56) References Cited

U.S. PATENT DOCUMENTS

| | | | |
|---|---|---|---|
| 6,117,180 A | 9/2000 | Dave et al. | |
| 6,138,270 A | 10/2000 | Hsu | |
| 6,397,254 B1 | 5/2002 | Northrup | |
| 6,421,705 B1 | 7/2002 | Northrup | |
| 6,442,751 B1 | 8/2002 | Cocchi et al. | |
| 6,487,713 B1 | 11/2002 | Cohen et al. | |
| 6,546,413 B1 | 4/2003 | Northrup | |
| 6,601,233 B1 | 7/2003 | Underwood | |
| 6,641,746 B2 | 11/2003 | Houge et al. | |
| 6,671,713 B2 | 12/2003 | Northrup | |
| 6,671,746 B1 | 12/2003 | Northrup | |
| 6,715,144 B2 * | 3/2004 | Daynes | G06F 8/61 717/168 |
| 6,779,000 B1 | 8/2004 | Northrup | |
| 6,807,636 B2 | 10/2004 | Hartman et al. | |
| 6,901,580 B2 | 5/2005 | Iwanojko et al. | |
| 6,922,675 B1 | 7/2005 | Chatterjee et al. | |
| 6,922,705 B1 | 7/2005 | Northrup | |
| 6,947,992 B1 | 9/2005 | Shachor | |
| 6,954,792 B2 | 10/2005 | Kang et al. | |
| 6,990,532 B2 | 1/2006 | Day et al. | |
| 7,013,461 B2 * | 3/2006 | Hellerstein | G06F 8/61 709/221 |
| 7,028,019 B2 | 4/2006 | McMillan et al. | |
| 7,062,749 B2 | 6/2006 | Cyr et al. | |
| 7,086,009 B2 | 8/2006 | Resnick et al. | |
| 7,117,216 B2 | 10/2006 | Chakraborty et al. | |
| 7,188,158 B1 | 3/2007 | Stanton et al. | |
| 7,203,938 B2 | 4/2007 | Ambrose et al. | |
| 7,263,686 B2 * | 8/2007 | Sadiq | G06F 9/44505 709/203 |
| 7,343,360 B1 | 3/2008 | Ristanovic et al. | |
| 7,349,913 B2 | 3/2008 | Clark et al. | |
| 7,421,716 B1 * | 9/2008 | Margulis | G06F 8/60 719/331 |
| 7,505,990 B2 | 3/2009 | Krishna et al. | |
| 7,516,492 B1 | 4/2009 | Nisbet et al. | |
| 7,535,927 B1 | 5/2009 | Northrup | |
| 7,536,606 B2 | 5/2009 | Andrews et al. | |
| 7,584,207 B2 | 9/2009 | Mortensen et al. | |
| 7,590,644 B2 | 9/2009 | Matsakis et al. | |
| 7,603,674 B2 | 10/2009 | Cyr et al. | |
| 7,644,262 B1 | 1/2010 | Bromley et al. | |
| 7,672,986 B2 | 3/2010 | Gilbert et al. | |
| 7,693,851 B2 * | 4/2010 | Becker | G06F 9/544 707/999.1 |
| 7,721,158 B2 | 5/2010 | Lee | |
| 7,774,477 B2 | 8/2010 | Zintel | |
| 7,783,782 B2 | 8/2010 | Cromp et al. | |
| 7,788,338 B2 | 8/2010 | Savchenko et al. | |
| 7,793,340 B2 | 9/2010 | Kiester et al. | |
| 7,827,494 B1 | 11/2010 | Hedayatpour et al. | |
| 7,840,941 B2 | 11/2010 | Brookins et al. | |
| 7,853,899 B1 | 12/2010 | Damaschke et al. | |
| 7,865,544 B2 | 1/2011 | Kordun et al. | |
| 7,895,512 B2 | 2/2011 | Roberts | |
| 7,933,946 B2 | 4/2011 | Livshits et al. | |
| 7,945,907 B2 | 5/2011 | Dreiling et al. | |
| 7,984,424 B2 | 7/2011 | Dengler et al. | |
| 8,015,545 B2 | 9/2011 | Seto et al. | |
| 8,108,825 B2 | 1/2012 | Goodwin et al. | |
| 8,209,675 B2 | 6/2012 | Zhao et al. | |
| 8,560,938 B2 | 10/2013 | Barrow et al. | |
| 8,613,108 B1 | 12/2013 | Aggarwal | |
| 9,210,149 B2 | 12/2015 | Chang et al. | |
| 10,078,668 B1 * | 9/2018 | Woodrow | G06F 17/30501 |
| 2002/0019778 A1 | 2/2002 | Isaacson et al. | |
| 2002/0023140 A1 | 2/2002 | Hile et al. | |
| 2002/0103660 A1 | 8/2002 | Cramon et al. | |
| 2002/0129060 A1 | 9/2002 | Rollins et al. | |
| 2002/0143735 A1 | 10/2002 | Ayi et al. | |
| 2002/0147757 A1 | 10/2002 | Day et al. | |
| 2002/0188613 A1 | 12/2002 | Chakraborty et al. | |
| 2003/0005117 A1 | 1/2003 | Kang et al. | |
| 2003/0025732 A1 | 2/2003 | Prichard | |
| 2003/0034989 A1 | 2/2003 | Kondo | |
| 2003/0084424 A1 | 5/2003 | Reddy et al. | |
| 2003/0088857 A1 | 5/2003 | Balva et al. | |
| 2003/0172127 A1 | 9/2003 | Northrup et al. | |
| 2003/0172168 A1 | 9/2003 | Mak et al. | |
| 2003/0172193 A1 | 9/2003 | Olsen | |
| 2003/0192031 A1 | 10/2003 | Srinivasan et al. | |
| 2003/0204518 A1 | 10/2003 | Lang et al. | |
| 2003/0204645 A1 | 10/2003 | Sharma et al. | |
| 2003/0233631 A1 | 12/2003 | Curry et al. | |
| 2003/0233642 A1 | 12/2003 | Hank | |
| 2004/0046787 A1 | 3/2004 | Henry et al. | |
| 2004/0046789 A1 | 3/2004 | Inanoria | |
| 2004/0054991 A1 | 3/2004 | Harres | |
| 2004/0064706 A1 | 4/2004 | Lin et al. | |
| 2004/0073565 A1 | 4/2004 | Kaufman et al. | |
| 2004/0078424 A1 | 4/2004 | Yairi et al. | |
| 2004/0111533 A1 | 6/2004 | Beisiegel et al. | |
| 2004/0111673 A1 | 6/2004 | Bowman et al. | |
| 2004/0148588 A1 | 7/2004 | Sadiq | |
| 2004/0181534 A1 | 9/2004 | Mortensen et al. | |
| 2004/0194016 A1 | 9/2004 | Liggitt | |
| 2004/0205117 A1 | 10/2004 | Hertling et al. | |
| 2004/0205765 A1 | 10/2004 | Beringer et al. | |
| 2004/0230639 A1 | 11/2004 | Soluk et al. | |
| 2005/0044197 A1 | 2/2005 | Lai | |
| 2005/0085928 A1 | 4/2005 | Shani | |
| 2005/0183074 A1 | 8/2005 | Alexander et al. | |
| 2005/0193061 A1 | 9/2005 | Schmidt et al. | |
| 2005/0223361 A1 | 10/2005 | Belbute | |
| 2005/0251788 A1 | 11/2005 | Henke et al. | |
| 2005/0273772 A1 | 12/2005 | Matsakis et al. | |
| 2006/0010163 A1 | 1/2006 | Herzog et al. | |
| 2006/0015847 A1 | 1/2006 | Carroll et al. | |
| 2006/0031750 A1 | 2/2006 | Waldorf et al. | |
| 2006/0036463 A1 | 2/2006 | Patrick et al. | |
| 2006/0075387 A1 | 4/2006 | Martin et al. | |
| 2006/0080217 A1 | 4/2006 | Carr et al. | |
| 2006/0101038 A1 | 5/2006 | Gabriel et al. | |
| 2006/0106626 A1 | 5/2006 | Jeng et al. | |
| 2006/0123414 A1 * | 6/2006 | Fors | G06F 8/61 717/177 |
| 2006/0130047 A1 | 6/2006 | Burugapalli | |
| 2006/0136832 A1 | 6/2006 | Keller et al. | |
| 2006/0143229 A1 | 6/2006 | Bou-ghannam et al. | |
| 2006/0150156 A1 | 7/2006 | Cyr et al. | |
| 2006/0165105 A1 | 7/2006 | Shenfield et al. | |
| 2006/0168132 A1 | 7/2006 | Bunter et al. | |
| 2006/0168355 A1 | 7/2006 | Shenfield et al. | |
| 2006/0168557 A1 | 7/2006 | Agrawal et al. | |
| 2006/0184866 A1 | 8/2006 | Rees | |
| 2006/0206858 A1 | 9/2006 | Becker et al. | |
| 2006/0235733 A1 | 10/2006 | Marks | |
| 2006/0235986 A1 | 10/2006 | Kim | |
| 2006/0242636 A1 | 10/2006 | Chilimbi et al. | |
| 2006/0253490 A1 | 11/2006 | Krishna et al. | |
| 2006/0265702 A1 | 11/2006 | Isaacson et al. | |
| 2006/0271537 A1 | 11/2006 | Chandrasekharan et al. | |
| 2006/0277542 A1 | 12/2006 | Wipfel | |
| 2006/0294474 A1 | 12/2006 | Taylor et al. | |
| 2006/0294506 A1 | 12/2006 | Dengler et al. | |
| 2007/0016429 A1 | 1/2007 | Bournas et al. | |
| 2007/0055936 A1 | 3/2007 | Dhanjal et al. | |
| 2007/0106975 A1 | 5/2007 | DeLine | |
| 2007/0113191 A1 | 5/2007 | Keller et al. | |
| 2007/0130205 A1 | 6/2007 | Dengler et al. | |
| 2007/0157078 A1 | 7/2007 | Anderson | |
| 2007/0169199 A1 | 7/2007 | Quinnell et al. | |
| 2007/0174763 A1 | 7/2007 | Chang et al. | |
| 2007/0174822 A1 | 7/2007 | Moser et al. | |
| 2007/0203956 A1 | 8/2007 | Anderson et al. | |
| 2007/0220429 A1 | 9/2007 | Kureshy et al. | |
| 2007/0240096 A1 | 10/2007 | Pontoppidan et al. | |
| 2007/0245340 A1 | 10/2007 | Cohen et al. | |
| 2007/0271552 A1 | 11/2007 | Pulley | |
| 2007/0277095 A1 | 11/2007 | Ukigawa | |
| 2007/0282885 A1 | 12/2007 | Baude et al. | |
| 2007/0294586 A1 | 12/2007 | Parvathy et al. | |

(56) References Cited

U.S. PATENT DOCUMENTS

| | | |
|---|---|---|
| 2007/0294664 A1 | 12/2007 | Joshi |
| 2008/0004887 A1 | 1/2008 | Brunswig et al. |
| 2008/0028302 A1 | 1/2008 | Meschkat |
| 2008/0065675 A1 | 3/2008 | Bozich et al. |
| 2008/0070593 A1 | 3/2008 | Altman et al. |
| 2008/0077848 A1 | 3/2008 | Roberts |
| 2008/0083012 A1 | 4/2008 | Yu et al. |
| 2008/0104617 A1 | 5/2008 | Apacible et al. |
| 2008/0120557 A1 | 5/2008 | Offenhartz et al. |
| 2008/0126396 A1 | 5/2008 | Gagnon |
| 2008/0127087 A1 | 5/2008 | Brookins et al. |
| 2008/0127124 A1 | 5/2008 | Gilfix et al. |
| 2008/0162304 A1 | 7/2008 | Ourega |
| 2008/0163164 A1 | 7/2008 | Chowdhary et al. |
| 2008/0168420 A1* | 7/2008 | Sabbouh .......... G06F 17/30893 717/104 |
| 2008/0183479 A1 | 7/2008 | Iwashita et al. |
| 2008/0183744 A1 | 7/2008 | Adendorff et al. |
| 2008/0184201 A1 | 7/2008 | Burns et al. |
| 2008/0189358 A1 | 8/2008 | Charles |
| 2008/0196024 A1 | 8/2008 | Barfield et al. |
| 2008/0243901 A1 | 10/2008 | Super et al. |
| 2008/0250313 A1 | 10/2008 | Kamdar et al. |
| 2008/0275844 A1 | 11/2008 | Buzsaki et al. |
| 2008/0276218 A1 | 11/2008 | Taylor et al. |
| 2008/0276260 A1 | 11/2008 | Garlick et al. |
| 2008/0295109 A1 | 11/2008 | Huang et al. |
| 2008/0313648 A1 | 12/2008 | Wang et al. |
| 2009/0006167 A1* | 1/2009 | Toussaint .............. G06Q 10/06 705/7.27 |
| 2009/0031280 A1 | 1/2009 | Koehler |
| 2009/0083297 A1 | 3/2009 | Pohl et al. |
| 2009/0106494 A1 | 4/2009 | Knebel |
| 2009/0144716 A1 | 6/2009 | Felts |
| 2009/0144729 A1 | 6/2009 | Guizar |
| 2009/0150565 A1 | 6/2009 | Grossner et al. |
| 2009/0157859 A1 | 6/2009 | Morris |
| 2009/0158237 A1 | 6/2009 | Zhang et al. |
| 2009/0178020 A1 | 7/2009 | Goodwin et al. |
| 2009/0204567 A1 | 8/2009 | Barrow |
| 2009/0204629 A1 | 8/2009 | Barrow |
| 2009/0204884 A1 | 8/2009 | Barrow et al. |
| 2009/0204943 A1 | 8/2009 | Konduri |
| 2009/0205013 A1 | 8/2009 | Lowes |
| 2009/0217153 A1 | 8/2009 | Oshima et al. |
| 2009/0259993 A1 | 10/2009 | Konduri et al. |
| 2009/0292797 A1 | 11/2009 | Cromp et al. |
| 2009/0313256 A1 | 12/2009 | Konduri et al. |
| 2010/0057482 A1 | 3/2010 | Radhakrishnan et al. |
| 2010/0057836 A1 | 3/2010 | Anbuselvan |
| 2010/0070553 A1 | 3/2010 | Addala et al. |
| 2010/0070973 A1 | 3/2010 | Addala et al. |
| 2010/0082556 A1 | 4/2010 | Srinivasan et al. |
| 2010/0132009 A1 | 5/2010 | Khemani et al. |
| 2010/0146291 A1 | 6/2010 | Anbuselvan |
| 2010/0191779 A1 | 7/2010 | Hinrichs |
| 2010/0236660 A1 | 9/2010 | Ozanne et al. |
| 2010/0313038 A1* | 12/2010 | Bradley .............. H04L 67/1061 713/189 |
| 2011/0023071 A1 | 1/2011 | Li et al. |
| 2011/0072431 A1* | 3/2011 | Cable .................... G06F 9/5077 718/1 |
| 2011/0119649 A1 | 5/2011 | Kand et al. |
| 2011/0119651 A1 | 5/2011 | Utschig-Utschig et al. |
| 2011/0225232 A1* | 9/2011 | Casalaina .......... G06F 17/30528 709/203 |
| 2012/0260228 A1* | 10/2012 | Mallick ..................... G06F 8/60 717/104 |
| 2013/0055118 A1* | 2/2013 | Donovan .......... G06F 17/30289 715/763 |
| 2013/0086568 A1 | 4/2013 | Krishnamurthy |
| 2013/0173720 A1* | 7/2013 | Vasudev ................. H04L 51/18 709/206 |
| 2014/0019407 A1* | 1/2014 | Wong ................ G06F 17/30289 707/609 |
| 2014/0047507 A1 | 2/2014 | Chang et al. |
| 2014/0215590 A1* | 7/2014 | Brand .................. H04L 67/1097 726/6 |
| 2015/0046204 A1* | 2/2015 | Sitina ................... G06Q 10/063 705/7.11 |
| 2015/0067128 A1* | 3/2015 | Naseh .................... G06F 9/5061 709/223 |
| 2015/0186668 A1 | 7/2015 | Whaley et al. |
| 2015/0317339 A1* | 11/2015 | Vranyes ............ G06F 17/30309 707/695 |
| 2016/0094626 A1* | 3/2016 | Bajaj ........................ H04L 67/10 709/203 |
| 2016/0142506 A1* | 5/2016 | Sahoo ................ H04L 67/2833 709/226 |
| 2016/0371021 A1* | 12/2016 | Goldberg .............. G06F 3/0619 |
| 2017/0003830 A1 | 1/2017 | Kessler et al. |

OTHER PUBLICATIONS

Direct Web Remoting, About DWR's JavaScript Security, downloaded from http://directwebremoting.org/dwr/security/script-tag-protection, Oct. 6, 2008, 4 pages.

Direct Web Remoting, DWR version 2—New and Noteworthy, downloaded from http://directwebremoting.org/dwr/changelog/dwr20, Dec. 5, 2008, 4 pages.

Direct Web Remoting, DWR: Easy AJAX for JAVA, downloaded from http://directwebremoting.org/dwr/overview/dwr, Oct. 6, 2008, 2 pages.

Direct Web Remoting, Safari, GET and Request Forgery, downloaded from http://directwebremoting.org/dwr/security/allowGetForSafariButMakeForgeryEasier, Oct. 6, 2008, 1 page.

Direct Web Remoting, Security, downloaded from http://directwebremoting.org/dwr/security, Oct. 6, 2008, 4 pages.

Dynamic Structure in ADF UIX Pages, Oracle ADF UIX Developer's Guide, downloaded from http://www.oracle.com/webapps/online-help/jdeveloper/1 0.1.2/state/content/navId.4/navSetId./vtAnchor.DeltaTree!vtTopicFile.uixheip%7Cuixdevguide%7Cdynamic%7Ehtml/, Apr. 21, 2008, pp. 1-11.

Google Web Toolkit, Product Overview, downloaded from http://code.google.com/webtoolkiUoverview. html, Oct. 6, 2008, 3 pages.

Oracle Application Framework, Oracle, Dec. 2006, pp. 1-242.

Altenhofen et al., "ASMs in Service Oriented Architectures", Journal of Universal Computer Science, vol. 14, No. 12, 2008, 25 pages.

Box et al., "Web Services Addressing (WS-Addressing)", http://www.w3.org/Submission/ws-addressing/#Toc77464317 „ Aug. 18, 2009, 23 pages.

Carey et al., "Making BPEL Processes Dynamic", Oracle Technology Network, Aug. 18, 2009, 8 pages.

Claypool et al., "Optimizing Performance of Schema Evolution Sequences", Objects and Databases, Lecture Notes in Computer Science vol. 1944, Mar. 1999, pp. 114-127.

Curphey et al., "Web Application Security Assessment Tools", IEEE, 2006, pp. 32-41.

Di Paola et al., "Subverting Ajax", 23rd CCC Conference, Dec. 2006, pp. 1-8.

Hildebrandt, "Web-based Document Management,", BTU 2001, 2001, pp. 1-21.

Hohpe et al., "Messaging Systems", Enterprise Integration Patterns Chapter 3, Pearson Education, Inc., Boston, Massachusetts, 2004, 45 pages.

MA , "Discovery-Based Service Composition", National Central University, Doctoral Dissertation, Jan. 2007, 109 pages.

Mietzner et al., "Defining Composite Configurable SaaS Application Packages Using SCA Variability Descriptors and Multi-Tenancy Patters", Third International Conference on Internet and Web Applications and Services, 2008. ICIW '08., Jun. 2008, pp. 156-161.

Nagappan et al., "XML Processing and Data Binding with Java APIs", Developing Java Web Services: Architecting and Develop-

(56) References Cited

OTHER PUBLICATIONS ing Secure Web Services Using Java [online] Retrieved from Internet:<http://java.sun.com/developer/Books/j2ee/devjws/>, 2003, pp. 313-399.

Phanouriou, "UIML: A Device-Independent User Interface Markup Language", Virginia Polytechnic Institute and State University, Sep. 26, 2000, 172 pages.

Phillips, "File and Registry Virtualization—the good, the bad. and the ugly", Window's Connected UserID : Jerry. Jerry's Incoherent Babbling:<http://windowsconnected.com/blogsfjerry/archive/2005/12/19/file-and-registry-virtualization-the-good-the thebad-and-the-ugly.aspx>., Dec. 19, 2005, 6 pages.

Smith, "Portals: Toward an Application Framework for Interoperability", Communications of the ACM, Oct. 2004, 47(10):93-97 pp.

Steinberg, "Data Binding with JAXB", <https://www6.software.ibm.com/developerworks/education/x-jaxb/x-jaxb-a4.pdf>, 2003, pp. 1-34.

Yang et al., Web Component: A Substrate for Web Service Reuse and Composition, Proceedings of the 14th International Conference on Advanced Information Systems Engineering, 2002, pp. 21-36.

Zhang et al., "Schema Based XML Security: RBAC Approach", IFIP International Federation for Information Processing vol. 142, 2004, pp. 330-343.

U.S. Appl. No. 12/029,600, Final Office Action, dated Oct. 19, 2011, 21 pages.

U.S. Appl. No. 12/029,600, Non-Final Office Action, dated Sep. 17, 2012, 24 pages.

U.S. Appl. No. 12/029,600, Non-Final Office Action, dated Apr. 27, 2011, 29 pages.

U.S. Appl. No. 12/029,600, Notice of Allowance, dated Jun. 11, 2013, 6 Pages.

U.S. Appl. No. 12/029,600, Notice of Allowance, dated Nov. 7, 2012, 9 pages.

U.S. Appl. No. 12/029,600, Notice of Allowance, dated Feb. 5, 2013, 9 Pages.

U.S. Appl. No. 12/029,605, Final Office Action, dated Nov. 2, 2011, 13 pages.

U.S. Appl. No. 12/029,605, Non-Final Office Action, dated May 12, 2010, 11 pages.

U.S. Appl. No. 12/029,605, Non-Final Office Action, dated Jul. 20, 2011, 13 pages.

U.S. Appl. No. 12/029,605, Non-Final Office Action, dated Apr. 10, 2013, 14 Pages.

U.S. Appl. No. 12/029,609, Final Office Action, dated Nov. 8, 2011, 13 pages.

U.S. Appl. No. 12/029,609, Non-Final Office Action, dated May 26, 2010, 17 pages.

U.S. Appl. No. 12/029,609, Non-Final Office Action, dated Jul. 28, 2011, 29 Pages.

U.S. Appl. No. 12/029,609, Notice of Allowance, dated Feb. 4, 2013, 24 pages.

U.S. Appl. No. 12/029,615, Advisory Action, dated Oct. 16, 2012, 5 pages.

U.S. Appl. No. 12/029,615, Final Office Action, dated Jul. 31, 2012, 33 pages.

U.S. Appl. No. 12/029,615, Non-Final Office Action, dated Feb. 15, 2012, 28 pages.

U.S. Appl. No. 12/029,724, Final Office Action, dated Apr. 30, 2013, 22 pages.

U.S. Appl. No. 12/029,724, Final Office Action, dated May 5, 2011, 21 pages.

U.S. Appl. No. 12/029,724, Non-Final Office Action, dated Dec. 14, 2010, 22 Pages.

U.S. Appl. No. 12/029,724, Non-Final Office Action, dated Jan. 7, 2013, 31 pages.

U.S. Appl. No. 12/101,420, Final Office Action, dated Feb. 24, 2012, 20 pages.

U.S. Appl. No. 12/101,420, Non-Final Office Action, dated Oct. 5, 2011, 18 pages.

U.S. Appl. No. 12/138,997, Final Office Action, dated Dec. 5, 2011, 13 pages.

U.S. Appl. No. 12/203,816, Final Office Action, dated Jan. 20, 2011, 23 pages.

U.S. Appl. No. 12/203,816, Non-Final Office Action, dated Oct. 26, 2012, 30 pages.

U.S. Appl. No. 12/210,657, Final Office Action, dated Apr. 3, 2012, 24 pages.

U.S. Appl. No. 12/210,657, Non-Final Office Action, dated Sep. 30, 2011, 22 pages.

U.S. Appl. No. 12/210,657, Non-Final Office Action, dated Apr. 25, 2011, 23 pages.

U.S. Appl. No. 12/210,657, Notice of Allowance, dated Jun. 26, 2012, 7 pages.

U.S. Appl. No. 12/212,599, Non-Final Office Action, dated Dec. 22, 2011, 11 pages.

U.S. Appl. No. 12/212,599, Non-Final Office Action, dated Aug. 2, 2012, 14 pages.

U.S. Appl. No. 12/330,008, Final Office Action, dated Apr. 10, 2012, 14 pages.

U.S. Appl. No. 12/330,008, Non-Final Office Action, dated Dec. 21, 2011, 15 pages.

U.S. Appl. No. 12/330,008, Notice of Allowance, dated Aug. 7, 2012, 17 pages.

U.S. Appl. No. 12/330,008, Notice of Allowance, dated Jun. 11, 2012, 8 pages.

U.S. Appl. No. 12/487,004, Advisory Action, dated May 24, 2012, 3 pages.

U.S. Appl. No. 12/487,004, Final Office Action, dated Mar. 19, 2012, 31 pages.

U.S. Appl. No. 12/487,004, Non-Final Office Action dated Sep. 28, 2011, 30 pages.

U.S. Appl. No. 12/790,437, Final Office Action, dated Jan. 30, 2013, 26 pages.

U.S. Appl. No. 12/790,445, Non-Final Office Action, dated Dec. 19, 2012, 23 pages.

U.S. Appl. No. 15/268,174, filed Sep. 16, 2016, [[52]] 56 pages.

Metadata Services (MDS) in Fusion Middleware 11g, An Oracle White Paper, Dec. 2009, 22 pages.

Oracle Data Integrator 12c Architecture Overview, An Oracle White Paper, Feb. 2014, 8 pages.

"Business Process Language (BPEL) and Oracle BPEL Process Manager", Oracle FAQ, Available online at: http://www.oracle.com/technology/products/ias/bpel/htdocs/orabpel_faq.html, Accessed from Internet on Nov. 11, 2009, 3 pages.

"Client-Server Modernization—From Oracle® Forms to Java", VGO Software Products, Available online at: http://www.vgosoftware.com/products/evo/index.php, Accessed from Internet on Aug. 28, 2009, 3 pages.

"Exodus™—Main Features & Benefits", CipherSoft Inc, Available online at: http://www.ciphersoftinc.com/products/expdus-features-benefits.html, Accessed from Internet on Aug. 28, 2009, 3 pages.

"Exodus™ Products, CipherSoft Inc"., Available online at: http://www.ciphersoftinc.com/products/migration-products-overview.html, Accessed from Internet on Aug. 28, 2009, 3 pages.

"Oracle Forms to Java Modernization", VGO Software Information, Available online at: http://www.vgosoftware.com/products/evo/walkthrough.php, Accessed from Internet on Aug. 28, 2009, 5 pages.

"VGO Software First to Convert Oracle Forms to Oracle ADF V11", VGO News, Available online at: http://www.vgosoftware.com/abouUnews/view/article.phpnewid=35, Sep. 16, 2008, 2 pages.

Belsiegel et al., "SCA Service Component Architecture—Assembly Model Specification", SCA Version 1.00, BEA Systems, Inc., Mar. 15, 2007, 91 pages.

Chapman et al., "SCA Service Component Architecture—Client and Implementation Model Specification for WS-BPEL", SCA version 1.00, BEA Systems, Inc., Mar. 21, 2007, 15 pages.

Chappell; David, "Introducing SCA", David Chappell & Associates, Jul. 2007, pp. 1-22.

Shepherd; Pat, "Oracle SCA—The Power of the Composite", An Oracle White Paper, Aug. 2009, pp. 1-19.

(56) References Cited

OTHER PUBLICATIONS

U.S. Appl. No. 12/029,605, Final Office Action dated Sep. 28, 2010, 13 pages.
U.S. Appl. No. 12/029,609, Final Office Action dated Oct. 13, 2010, 13 pages.
U.S. Appl. No. 12/138,997, Non-Final Office Action dated Jun. 24, 2011, 15 pages.
U.S. Appl. No. 12/203,816, Non-Final Office Action dated Sep. 2, 2010, 17 pages.
U.S. Appl. No. 15/268,174, Non-Final Office Action dated May 2, 2019, 19 pages.
U.S. Appl. No. 15/268,174, Notice of Allowance dated Aug. 16, 2019, 12 pages.

* cited by examiner

MULTI-TENANT CUSTOMIZABLE COMPOSITES

CROSS-REFERENCE TO RELATED APPLICATIONS

This application is a non-provisional application and claims the benefit and priority of U.S. Provisional Application No. 62/235,313, filed on Sep. 30, 2015 titled "MULTI-TENANT CUSTOMIZABLE COMPOSITES," and is related to U.S. Provisional Application No. 62/243,497, filed on Oct. 19, 2015 titled "SHARING COMMON METADATA IN MULTI-TENANT ENVIRONMENT", and U.S. application Ser. No. 15/268,174, filed on Sep. 16, 2016 titled "SHARING COMMON METADATA IN MULTI-TENANT ENVIRONMENT," which are herein incorporated by reference in their entirety for all purposes.

FIELD

The present disclosure generally relates to a system and method for supporting customizable composites in a multi-tenant environment.

BACKGROUND

Service-Oriented Architecture (SOA) is used to facilitate the interaction between software components on computers connected over a network, such as a cloud-based network. Functions from enterprise applications are separated into interoperable, standards-based services, which can then be combined with other services and reused to meet particular business needs. Thus, using SOA, functionality provided by applications (from potentially multiple vendors) can be integrated as one or more services, and orchestrated into new composite applications or composites. Composites can contain both new services created specifically for the application and also a business function from existing systems and applications, reused as part of the composition.

SOA enables business objectives while building an enterprise quality system. SOA includes a collection of standards and practices including service component architecture (SCA). SCA is a set of specifications which describe a model for building applications and systems using an SOA. SCA provides a model for the composition of services and for the creation of service components, including the reuse of an existing application function within SCA compositions. SCA extends and complements approaches to implementing services, and SCA builds on open standards such as Web services. By using SCA, a business function is provided as a series of services that are assembled together to create solutions that serve a particular business need.

SOA can be implemented in an SOA middleware container (e.g. SOA Suite). A container is, for example, a program, such as a Java program which is capable of running other programs. A container can be, for example, a run-time engine. The SOA container can store applications, such as Oracle Fusion Applications and other applications. Fusion Applications are targeted applications for different industries (e.g., financial, accounting, customer service, supply chain, etc.). Fusion Applications are pre-built applications which can be customized for businesses.

The services can be orchestrated using orchestration capabilities like Business Process Execution Language (BPEL) or business process management (BPM). BPEL is an XML-based language that allows Web services in a service-oriented architecture (SOA) to interconnect and share data. Composites can be developed to support an organization's business processes.

However, SOA was not initially designed to support multi-tenancy in a cloud network. Multi-tenancy is a mode of operation of software where multiple independent instances of one or multiple applications operate in a shared environment. In a multi-tenant software architecture, a single instance of a software runs on a server and serves multiple tenants. A tenant is a user or a group of users who share a common access with specific privileges to the software instance. Therefore, a tenant can include one user or more than one user. For example, a tenant can be a company or a business and a user or group of users can include one or more employees of the company or business.

Since multi-tenancy may not be supported in the SOA container, when applications, such as composite applications, are stored, issues can arises where the same application information is being stored separately for each tenant. Each tenant would have their own complete installation of the SOA container (e.g. SOA Suite). Further, prior to the storage of data in a cloud, tenants would run their composite applications locally at, for example, their business site. Each tenant individually stores in, for example, a database and memory, the information for a particular application. This may be duplicative since a large percentage of the information may be the same for each application and a small percentage of the information may be that which is customized for the tenant.

Therefore, a method of supporting multi-tenancy in an SOA middleware container is desired.

SUMMARY

Systems, methods and computer-readable memory for supporting multi-tenancy in a multi-tenant application server environment are described.

According to an exemplary embodiment, a system can include a memory and one or more processors, a first partition in a multi-tenant server environment comprising a first composite, wherein the first composite comprises first metadata that is configured to be customized for a first tenant of the first partition, a second partition in the multi-tenant server environment comprising a second composite, wherein the second composite comprises second metadata that is configured to be customized for a second tenant of the second partition, and a global runtime in the multi-tenant server environment comprising a global composite, wherein the global composite comprises global metadata that is configured to be shared by the first partition and the second partition.

According to an exemplary embodiment, a method can include at a computer system having a processor and a memory, configuring a first composite of a first partition in a multi-tenant server environment, wherein the first composite comprises first metadata that is configured to be customized for a first tenant of the first partition, configuring a second composite of a second partition in the multi-tenant server environment, wherein the second composite comprises second metadata that is configured to be customized for a second tenant of the second partition; and configuring a global composite of a global runtime in the multi-tenant server environment, wherein the global composite comprises global metadata that is configured to be shared by the first partition and the second partition.

According to an exemplary embodiment, a computer-readable memory can include a set of instructions stored therein which, when executed by a processor, causes the processor to configure a first composite of a first partition in a multi-tenant server environment, wherein the first composite comprises first metadata that is configured to be customized for a first tenant of the first partition, configure a second composite of a second partition in the multi-tenant server environment comprising, wherein the second composite comprises second metadata that is configured to be customized for a second tenant of the second partition, and configure a global composite of a global runtime in the multi-tenant server environment comprising, wherein the global composite comprises global metadata that is configured to be shared by the first partition and the second partition.

The foregoing, together with other features and exemplary embodiments, will be described in more detail below.

BRIEF DESCRIPTION OF THE DRAWINGS

The disclosure will be readily understood by the following detailed description in conjunction with the accompanying drawings, wherein like reference numerals designate like elements, and in which.

DETAILED DESCRIPTION

Figure 1:
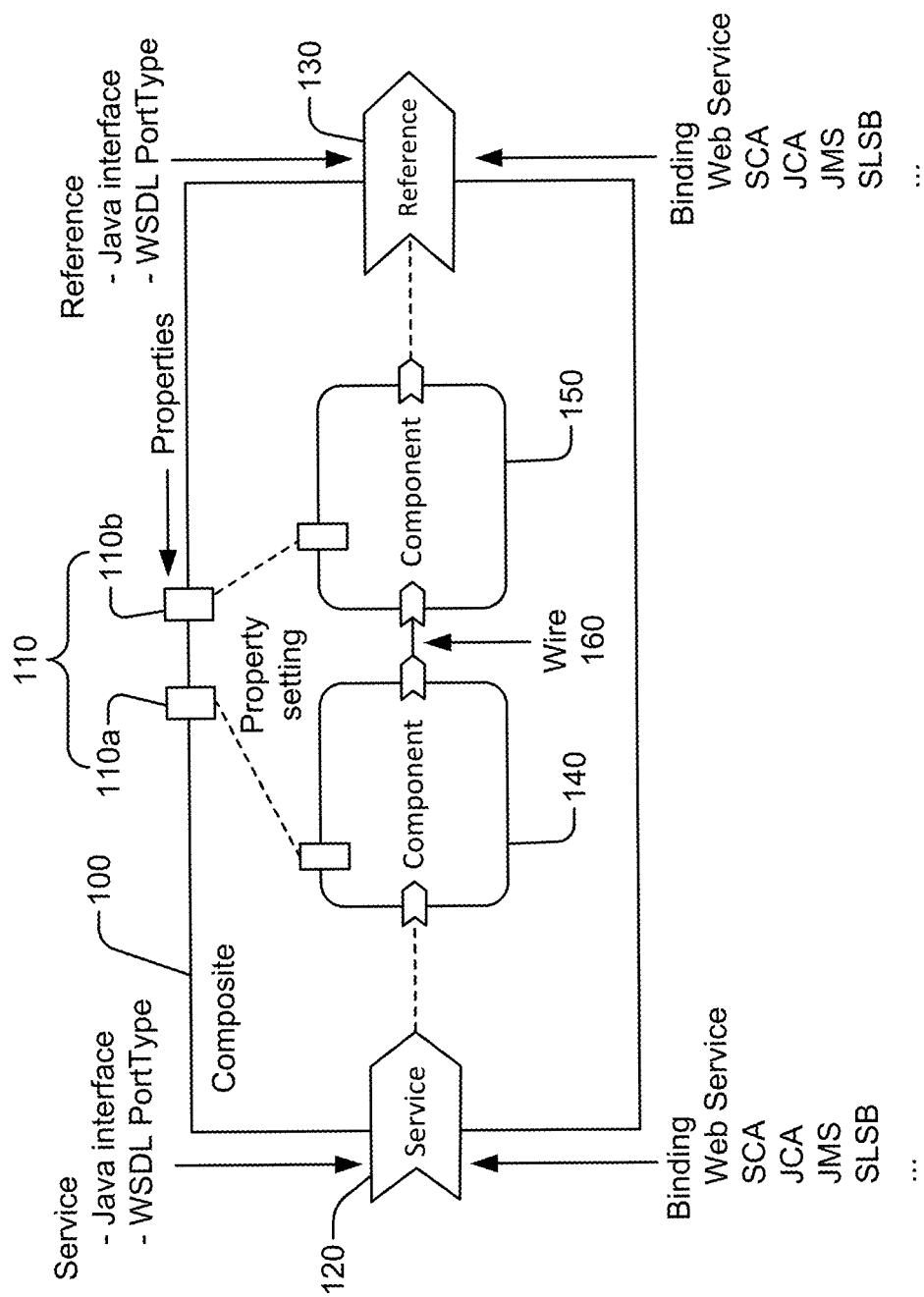
FIG. 1 illustrates a composite, in accordance with some exemplary embodiments.

In the following description, for the purposes of explanation, specific details are set forth in order to provide a thorough understanding of the exemplary embodiments. However, it will be apparent that various embodiments may be practiced without these specific details. The figures and description are not intended to be restrictive.

Application servers generally provide a managed environment within which software applications can be deployed and run. Cloud-based environments allow applications to run within and take advantage of the distributed resources provided by a cloud. Such environments can support large numbers of users or tenants, some of which may have specific requirements that are particular to that user or tenant.

To address the needs of such environments, in accordance with some exemplary embodiments, described herein is a system and method for supporting multi-tenancy in an application server, cloud, on-premise, or other environment, which enables composite applications to be customized for each tenant.

The system can support multi-tenant use cases that provide software-as-a-service (SaaS) or platform-as-a-service (PaaS) capabilities. For example, in a SaaS use case, a fusion application can be hosted. Standard composite applications would be provided and a user or customer can make customizations. In a PaaS use case, a SOA container can be hosted. Each user or customer can define their own composite application.

In the past, each tenant (e.g. a business or company) that is a customer of the SOA middleware container (e.g. SOA Suite) would have their own complete installation of the SOA middleware container underlying the fusion application. In accordance with some exemplary embodiments, only a single installation of the middleware container and applications, such as fusion applications, is needed for multiple tenants. A tenant can include one user or more than one user. For example, a tenant can be a company or a business and a user or group of users can include one or more employees of the company or business.

The SOA middleware container is a flexible integration framework and can be, for example, SOA Suite. The SOA middleware container integrates heterogeneous systems. For example, if a company would like to integrate two systems, such as a travel reservation system (e.g. Semi-automated Business Research Environment (SABRE)) and a back end database, to communicate with each other, the SOA middleware container sits between these two systems. The two systems communicate with each other through the use of one or more composite applications which is interpreted by the SOA middleware container.

The SOA middleware container is a program which runs other programs and is, for example, a run-time engine. The SOA middleware container executes or interprets documents, such as documents which make up a composite application. Fusion applications are built for the SOA middleware container. The fusion applications are built as composite applications and the composite applications run in the SOA middleware container.

An exemplary embodiment allows for the existence of multi-tenant customizable composites in an SOA middleware container. A composite application, also known as an integration application, is an application that can be made up of composites from multiple and different parts. A composite application can include an assembly of services, service components, and references designed and deployed together in a single application. Wiring between the service, service component, and reference enables message communication. The composite application processes the information described in the messages.

A composite application can be written according to the service component architecture (SCA) specification. The SCA specification defines how various enterprise pieces are created and assembled together as modular components to increase IT sustainability and flexibility. The composite applications are written in high level languages, such as Business Process Execution Language (BPEL) or business process management (BPM), and the SOA middleware container interprets and runs the high level languages. The users, such as businesses and companies, can program the SOA middle container using a graphical environment.

Also, in accordance with some exemplary embodiments, each tenant can be isolated from each other in terms of security and level of service.

Although exemplary embodiments are described with respect to multi-tenancy, exemplary embodiments may also be applicable to customers, such as companies and businesses, who are not supporting multi-tenancy.

I. Composite

A composite, also known as composite application or an integration application, is an application that can be made up of one or more components from multiple and/or different parts. A composite application can be built up out of other composite applications. A composite application can be directed to, for example, determining credit ratings or obtaining stock quotes. Composite applications can be directed to performing various operations and obtaining different types of data. Further, a composite application can be written in, for example, Extensible Markup Language (XML).

FIG. 1 illustrates a composite, in accordance with some exemplary embodiments. As shown in FIG. 1, the composite 100 includes properties 110, service 120, reference 130, component 140, component 150 and wire 160.

The composite 100 is the main unit of deployment and can include one or more components 140 and 150. The composite 100 can be created using, for example, JDeveloper which is a graphical modeling tool. JDeveloper is an integrated development environment that simplifies the development of Java-based SOA and Java EE applications.

Components 140 and 150 provide logic which can be used within composite 100. Components 140 and 150 can each provide an atomic portion of a business functionality. Two components are shown in FIG. 1, however, the exemplary embodiments are not limited to two components. The composite 100 can include one component or more than one component.

Components 140 and 150 can be wired together via wire 160 into composite 100. Components 140 and 150 can include properties 110 specific to each component. Properties 110 allow for customization of a component's behavior for a particular deployment. Component 140 can include properties 110a and component 150 can include properties 110b. Properties can be used to configure the behavior of a composite. For example, audit level can be used to determine how much logging is performed.

Components such as BPEL, business rules, web services, human tasks, and mediators, can be included in the JDeveloper integrated development environment (IDE). That is, service components can include BPEL processes which provide process orchestration and storage of synchronous or asynchronous process, business rules which enable a user to design a business decision based on rules, human tasks which provide workflow modeling that describes the tasks for users or groups to perform as part of an end-to-end business process flow, and mediators which route events (messages) between different components.

The metadata that describes the components 140 and 150 in composite 100 can be unified in a composite file and deployed to a Metadata Store (MDS). The MDS backs the composite application at design-time and runtime.

Components 140 and 150 can each be directed to performing a particular task or set of tasks. Components 140 and 150 offer their functions as services, and can either be used by other components within the same module (e.g., composite 100) or can be made available for use outside of the module through entry points. Component 140 may depend on services provided by other components, such as component 150. For example, component 140 can be directed to determining a person's credit card history and component 150 can be directed to allowing a person to apply for a loan based on the credit card history that is determined in component 140.

Each service component is hosted in its own service engine container. Messages sent to the service engine are targeted at specific service components. For example, a message targeted for a BPEL process is sent to the BPEL service engine.

The service 120 exposes components 140 and 150. The service 120 can expose component 140 and component 150 through, for example, an application programming interface (API). Service 120 exposes a chain of one or more components, such as component 140 and component 150. The service 120 can also act as the entry point to the composite. A service can include a service interface and a binding. Each of the components has a service interface. Services that are exposed by a component and are callable from outside of the composite are promoted services. A service can include, for example, a credit rating service, a billing service, or any kind of service where information would be obtained.

Services provide the outside world with an entry point to the SOA composite application. Services are advertised externally. Service 120 can refer to, for example, a service such as a JAVA interface or a Web Service Definition Language (WSDL) Port Type. The WSDL file of the service advertises its capabilities to external applications. Service 120 can also refer to, for example, a binding service, such as a web service, Service Component Architecture (SCA), J2EE Connector Architecture (JCA), Java Message Service (JMS), Stateless Session Bean (SLSB). The binding service or connectivity of the service describes the protocols that can communicate with the service, for example, SOAP/HTTP or a JCA adapter. Reference 130 can refer to a reference such as a JAVA interface or a WSDL Port Type. Reference 130 can also refer to a binding reference such as a web service, SCA, JCA, JMS, SLSB.

There can also be a reference 130 to other services which are calling the component. The references can also be known as dependencies. The reference 130 may be local or remote and may refer to internal or external services. References can either be linked to services provided by, for example, components 140 and 150 that are in the same composite 100, or references can be linked to services provided outside of the composite 100, which potentially can be provided by another composite. References can enable messages to be sent from the SOA composite application to external services in the outside world.

Components 140 and 150 are linked together as dependencies or references through wire 160. Wire 160 connects component 140 and component 150. A single wire 160 is shown in FIG. 1, however, this is merely exemplary. If, for example, three components are included in a composite then two or more wires may be used.

A wire can also act as a link between references and services, such as, reference 130 and service 120. Wires enable a user to graphically connect components (e.g. services to service components, service components to other service components, service components to reference) in a single SOA composite application for message communication.

Composites with different scopes can be combined in an SOA container. Although a single composite is shown in FIG. 1, several composites can be used. For example, several composite applications may be used and orchestrated in order to perform a business process. Composite scopes can include global, tenant, and shared. Therefore, a composite can include a tenant document, a shared document and a global document. A document can also be called an artifact.

A. Global Composite, Tenant Composite, Shared Composite

Figure 2:
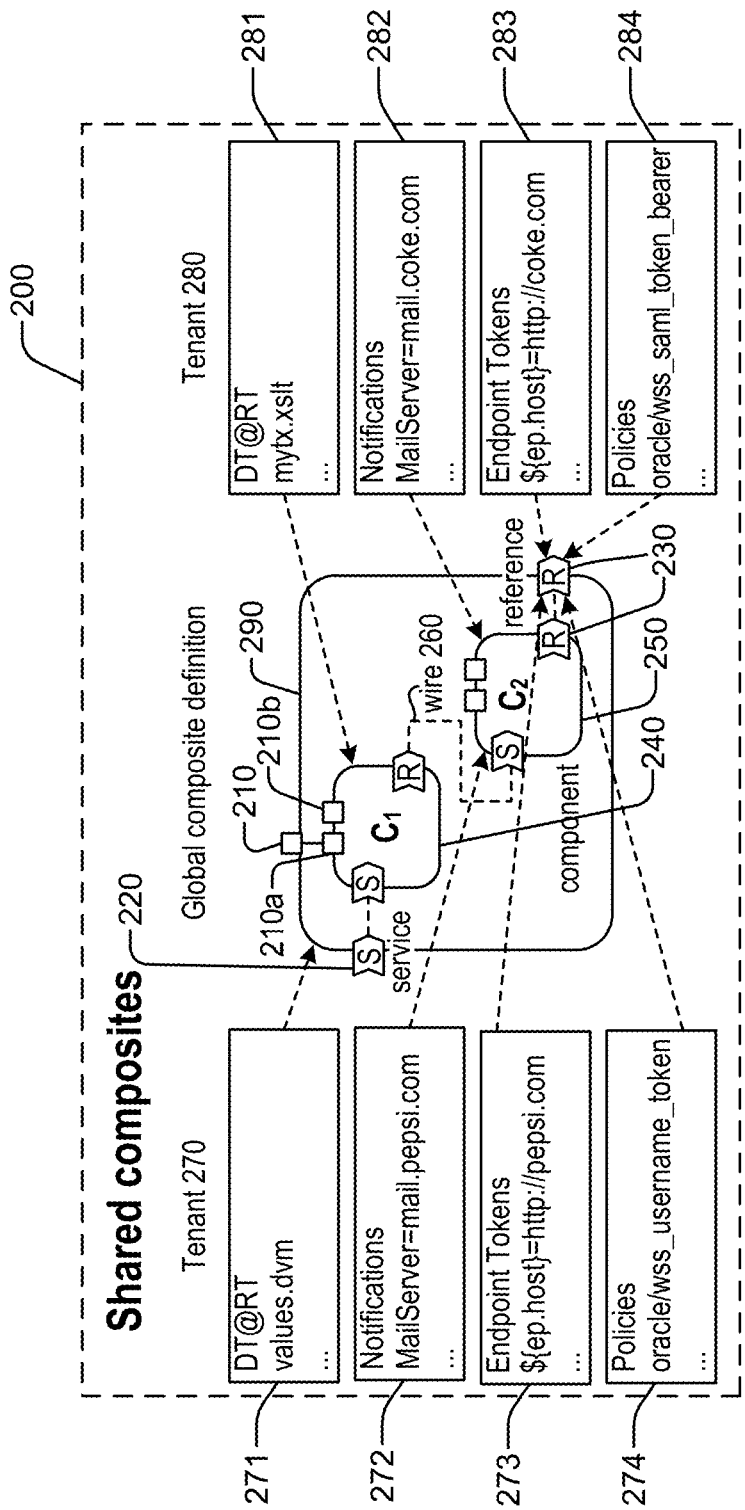
FIG. 2 illustrates composites, in accordance with some exemplary embodiments.

FIG. 2 illustrates composites, in accordance with some exemplary embodiments. As shown in FIG. 2, the global composite 290 can include service 220, properties 210, component 240, component 250, reference 230 and wire 260. A shared composite 200 can include data from the global composite 290.

The global composite 290 can include component 240 and component 250. The components can include properties which allow for customization of a component's behavior for a particular deployment. For example, component 240 can include properties 210a and 210b. The global composite 290 can also include service 220, wire 260 and reference 230.

A global composite can be deployed to the global runtime, and invoked in the global runtime. A global composite can be used by, for example, customers who do not need multi-tenancy or by customers who would like to use the global composite. The global composite can also be customized by a tenant.

The global document, which makes up the global composite, can include metadata that can be stored in a global database. The global metadata that is common to one or more tenants is centralized. The portion of the metadata which is specific to or customized for each tenant, is not shared among the tenants. A global composite can be part of a fusion application which is purchased by a tenant.

A tenant composite (not shown in FIG. 2) can include metadata that is specific to a particular tenant. For example, the metadata, which makes up a tenant document of the tenant composite, would be metadata which is only for the particular tenant. A tenant composite can be deployed to a WLS partition and can be invoked in the partition. A partition can also be known as a folder. A partition is a virtual server container. For example, a partition can be a virtual WebLogic server.

As shown in FIG. 2, the global composite 290 can be customized for each tenant in order to create shared composites 200 for tenant 270 and tenant 280. The shared composites 200 can include metadata from the global composite 210 that can be customized for a particular tenant.

As shown in FIG. 2, the global composite 290 can be modified by a tenant 270 and a tenant 280. Therefore, the tenant 270 and the tenant 280 can create a shared composite based off of the global composite. That is, tenant 270 and the tenant 280 can customize the global composite 210 to create a shared composite for each of tenant 270 and tenant 280. A shared composite can be used for the "out-of-the-box" fusion application SaaS composites. A shared composite can also be used when a composite is customized differently for different departments or sites.

A shared composite can be customized according to each tenant. For example, customizations can include business rules, human task definitions, domain value maps, Extensible Stylesheet Language Transformations (XSLT), Oracle Web Services Manager (OWSM) Web Service Policies, notification settings, composite properties, endpoint tokens for access external service endpoints, and customer Java libraries.

As shown in FIG. 2, tenant 270 can customize, for example, the design time at run time (DT@RT) 271, notifications 272, endpoint tokens 273 and policies 274. The tenant 280 can customize, for example, the design time at run time (DT@RT) 281, notifications 282, endpoint tokens 283 and policies 284.

Applications, such as business process applications, can be built during design time. Therefore, an integrated development environment (IDE), such as JDeveloper, can be used to define a business process. When the application is deployed, the application then runs during runtime. DT@RT 271 and DT@RT 281 customizations can include making design time changes during runtime. DT@RT 271 customizations could be made on, for example, global composite 290. DT@RT 281 customizations could be made on, for example, component 240 of global composite 290. The design of the application can be changed after is has been already deployed.

DT@RT 271 customization can include domain value map (DVM) customizations such as key value pairs. An example of key value pairs would include state abbreviations and states. DT@RT 281 customization can include XSLT, which is XML transformation language. Although these examples of DT@RT customizations are described, DT@RT customizations are not limited to these examples.

Notifications 272 and 282 can include configuring notifications in a component 240 and component 250, respectively. Notifications can be customized so as to be sent to mail servers based on, for example, a customer or based on rules as to who should be notified.

End point tokens 273 and 283 can include, for example, external reservation systems which are on a different system or server from that of a customer. The end point tokens 273 and 283 can be customized for a reference 230.

Policies 274 and 284 can include configuring the behavior of different services 220, references 230 and wires 260. For example, customizing a type of security, user authentication, or encryption standard.

The global composite, tenant composite, and shared composite can be implemented in a server container, such as a WebLogic server, of a multi-tenant environment.

II. Multi-Tenant Environment

In a multi-tenant (MT) environment, which can include a multi-tenant architecture, a software application is designed to provide every tenant a dedicated share of the instance including its data, configuration, user management, tenant individual functionality and non-functional properties. The instances of the tenant applications are logically isolated, but physically integrated. Therefore, resources such as machines and databases can be shared and the tenant applications are not shared. Unrelated parties, such as unrelated companies, can use the shared resources but the companies will be isolated from each other and cannot access each other's applications.

Figure 3:
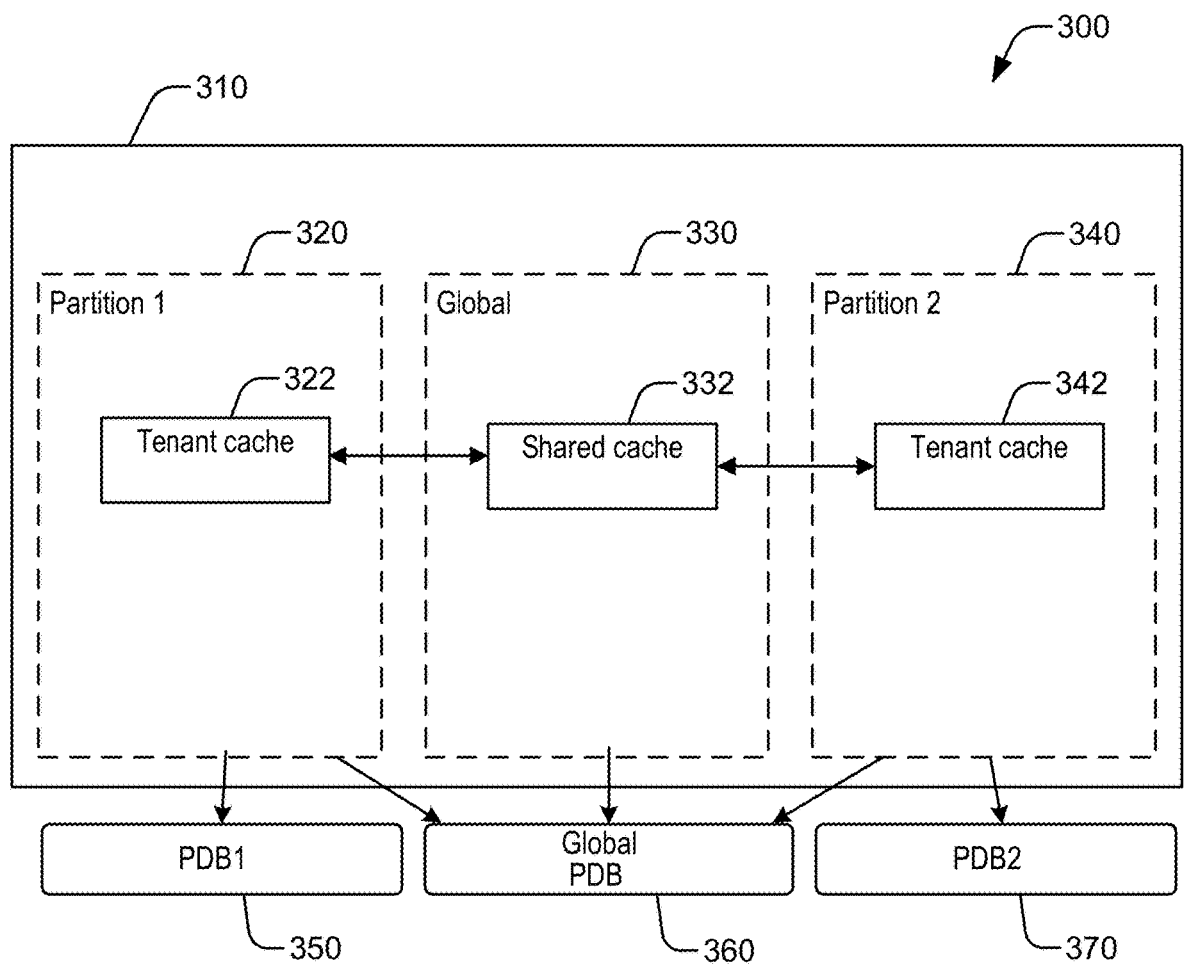
FIG. 3 is a general illustration of a multi-tenant architecture, in accordance with some exemplary embodiments.

FIG. 3 is a general illustration of a multi-tenant environment, in accordance with some exemplary embodiments.

The multi-tenant environment 300 can include a server container 310, database 350, global database 360, and database 370. The server container 310 can be, for example, a WebLogic server (WLS) container. The server container 310 can include partition 320, partition 340 and global runtime 330. Partition 320 and partition 340 can belong to a tenant or a user of the SOA container, such as a company or business. A SOA container (e.g. SOA Suite) can be an application which is run inside of the server container 310.

A partition provides an administrative and runtime subdivision of a domain, and contains one or more resource groups. Each resource group can reference a resource group template, to bind deployable resources to partition-specific values, for use by the referencing partition. A tenant of the application server or cloud environment can be associated with a partition, or applications deployed therein, for use by that tenant. A partition can be addressed externally by using a uniform resource location (URL). Although two partitions are shown in FIG. 3, there can be more than two or fewer than two partitions.

As shown in FIG. 3 there is a separate database, such as a pluggable database (PDB), for each of partition 310, partition 340 and global runtime 330. Pluggable databases will allow multiple databases to run under one copy, or instance, of the database software. Partition 310 can be associated with database 350, global runtime can be associated with global database 360 and partition 340 can be associated with database 370. Metadata can be customized for each tenant and stored separately for each tenant in their respective database.

For example, metadata of composite applications for a first tenant, such as a company, can be stored in database 350 which corresponds to the partition 320 of the first tenant. Metadata of composite applications for a second tenant, such as a company, can be stored in database 370 which corresponds to the partition 340 of the second tenant. Metadata for a global composite can be stored in global database 360. Databases 250, 260 and 270 can be logically separate databases but they can be administered as part of a single container database. Further, any database structure can be used other than that which is shown in FIG. 3.

Partition 320, global runtime 330 and partition 340 are logical isolated runtimes within server container 310. Partition 320 and partition 340 can run an instance of the SOA container server runtime. Global runtime 330 can also run an instance of the SOA container server runtime and can support global and shared composites.

Partition 320 includes a tenant cache 322, global runtime 330 includes a shared cache 332, and partition 340 includes a tenant cache 342. Tenant cache 322, shared cache 332, and tenant cache 342 can be, for example, a memory during runtime within partition 320, global runtime 330 and partition 340, respectively. Tenant cache 322 can reference for example, a tenant composite and a shared composite stored in database 350 and a global composite stored in global database 360. Tenant cache 322 can reference for example, a tenant composite and a shared composite stored in database 350 and a global composite stored in global database 360. Shared cache 332 can reference, for example, a global composite stored in global database 360.

Therefore, the shared cache 332 is not being duplicated for each tenant, but each of the tenants in the server container 310 can share the shared cache 332. One or more tenants can interact with the global runtime 330 while at the same time interacting with their own tenant-specific data.

Figure 4:
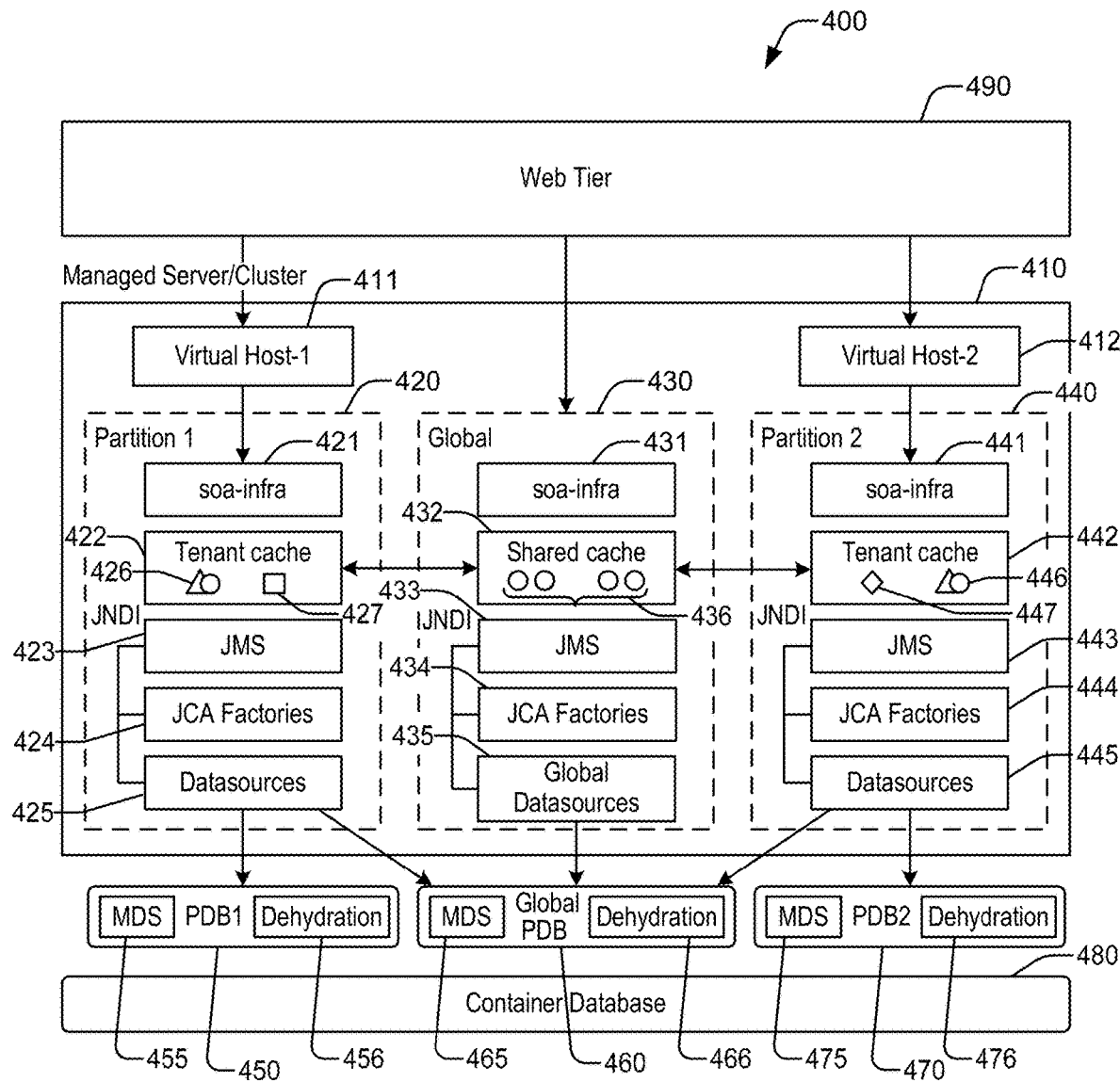
FIG. 4 is a more detailed illustration of a multi-tenant architecture, in accordance with some exemplary embodiments.

FIG. 4 is a more detailed illustration of a multi-tenant environment, in accordance with some exemplary embodiments. As shown in FIG. 4, the multi-tenant environment 400 includes a server container 410, a web tier 490, and a container database 480. Web tier 490 is, for example, a load balancer. The web tier can use, for example, an Oracle HTTP Server (OHS).

Server container 410 can include a partition 420, global runtime 430, and partition 440. The server container 410 can be, for example, a WebLogic Server (WLS) container. A SOA application can be run in the server container 410.

A virtual host 411 can communicate with partition 420. A virtual host 412 can communicate with partition 440. Specifically, the server container 410 can expose virtual host 411 and virtual host 412. Therefore, if requests are received, the requests can be routed by the virtual hosts 411 and 412 to the appropriate partition. Requests can be routed to the correct partition based on, for example, a uniform resource locator (URL).

The container database 480 can include one or more databases such as database 450, global database 460 and database 470. Database 450, global database 460 and database 470 can be, for example, pluggable databases. Databases 450, 460 and 470 can be logically separate databases but they can be administered as part of a single container database 480. Further, any database structure can be used in addition to or alternative to the databases shown in FIG. 4.

As shown in FIG. 4, there is a separate pluggable database for partition 420, partition 440 and global runtime 430. For example, partition 420 can be associated with database 450, global runtime can be associated with global database 460, and partition 440 can be associated with database 470.

Metadata can be customized for each tenant and stored separately for each tenant in their respective database. Metadata of composite applications for a first tenant can be stored in database 450 which corresponds to the partition 420 of the first tenant. Metadata of composite applications for a second tenant can be stored in database 450 which corresponds to the partition 440 of the second tenant. Metadata for a global composite can be stored in global database 460.

The metadata stored in database 450 and database 470 of the tenants can include for example, metadata regarding customizations of a global document and metadata regarding a tenant document which is only for the particular tenant. A tenant composite can be isolated for each tenant or can be shared across tenants. Therefore, shared metadata can be isolated within each tenant or shared across tenants.

Metadata services (MDS) can be used for storing the metadata. MDS can provide a unified store for metadata, MDS can ensure consistent and reliable access to the metadata. MDS can include, for example, the services and processes for storing data in a database. For example, MDS 455 can be used as a service for storage and management of metadata in database 450, MDS 465 can be used as a service for storage and management of metadata in global database 460, and MDS 475 can be used as a service for storage and management of metadata in database 470. The SOA container can use the MDS metadata subsystem's layered customization support to keep tenant customizations separate from the global document. The MDS framework allows a user to create customizable applications. The MDS assembles the document and is used in the storage of metadata.

Documents in MDS 465 can be shared with partition 420 and partition 440. A shared composite can include metadata that can be shared between partition 420 and partition 440. That is, the metadata can be shared between tenants. Therefore, the documents do not need to be included in each composite that references the document.

As shown in FIG. 4, database 450 can include dehydration 456, global database 460 can include dehydration 466 and database 470 can include dehydration 476. Dehydration 456, dehydration 466, and dehydration 476 can store information about long running processes, such as business processes.

As shown in FIG. 4, the server container 410 includes global runtime 430. Global runtime 430 includes shared cache 436 which references one or more global documents 436 in global database 460. The global documents 436 can include global metadata that is stored centrally in the global database 460. The global document would be deployed in the global runtime.

The global document can act as a base document or template which can be modified by a tenant. If the tenant of, for example, partition 420 would like to use one or more of the global documents 436 without making any customizations, the shared cache 432 of the global runtime 430 would be accessed by the processes of the first tenant during runtime of the server container 410. The shared cache 432 references the one or more global documents 436 which make up a global composite that is stored in the global database 460. The global document which has not been modified or which acts as a base document for customization can be stored in the global database 360. Therefore, metadata is not being stored multiple times.

As shown in FIG. 4, there is a partition 420 for a first tenant and a partition 440 for a second tenant. Partition 420 and partition 440 can be completely isolated from each other or they can communicate with each other as desired by a tenant. Partition 420 and partition 440 can each have an instance of an SOA container, such as SOA suite, running.

If the tenant of, for example, partition 420 would like to use the global document 436, but the tenant would like to modify one or more of the metadata of the one or more of the global documents 436, then the tenant of partition 420 can customize the one or more global documents. For example, the global composite can be deployed in order to populate the shared cache 432 with references to one or more global documents 436. The one or more global documents 436 make up the global composite.

The tenant of partition 420 can then customize the one or more global documents 436 to create a customized global document 426 for that tenant. The customizations to the global document 426 can then be stored in the database 450 of partition 420 belonging to the tenant. That is, the customizations or changes that the tenant has made to the global document 436, which can make up a shared composite, can be stored in the database 450 belonging to that tenant.

If the tenant of, for example, partition 440 would like to use the global document 436, but the tenant would like to modify one or more of the metadata of the one or more of the global documents 436, then the tenant of partition 440 can customize the one or more global documents. For example, the global composite can be deployed in order to populate the shared cache 432 with references to one or more global documents 436. The one or more global documents 436 make up the global composite.

The tenant of partition 440 can then customize the one or more global documents 436 to create a customized global document 446 for that tenant. The customizations to the global document, which can make up a shared composite, can then be stored in the database 470 of partition 440 belonging to the tenant. That is, the customizations or changes that the tenant has made to the global document 436 can be stored in the database 470 belonging to that tenant.

Therefore, the customizations are stored for each partition but the global composite is not stored for each partition. The partitions in the server container 410 can reference the global runtime. The partitions within the server container keep the modified global documents, which make up a shared composite, separate from other tenants.

Tenant cache 422 of the tenant in partition 420 can include references to one or more tenant documents 427. Tenant cache 442 of the tenant in partition 440 can include references to one or more tenant documents 447. Tenant document 427 includes metadata specific for the tenant in partition 420. Tenant document 447 includes metadata specific for the tenant in partition 440. Tenant document 447 would not be used by the tenant in partition 440, and tenant document 447 would not be used by the tenant in partition 420. Documents which are specific to and authorized by the tenant can include documents that only the particular tenant can access and are not in a shared cache 432. For example, an application directed to XSL transformation (XSLT) can be authored completely by a tenant and a base document or global document may not be used.

When the tenant of partition 420 executes a process, such as a business process, during runtime of the server container 410, the documents referenced in the tenant cache 422 would be used before referencing the documents in the shared cache 432. When the tenant of partition 440 executes a process, such as a business process, during runtime of the server container 410, the documents referenced in the tenant cache 442 would be invoked before referencing the documents in the shared cache 432.

A global document or tenant document can be referenced in its respective cache but the document is stored in its respective database. The documents can be referenced based on, for example, a library of classes or variables. Classes and shared metadata can be cached globally in order to improve density. Server code libraries, such as WebLogic libraries, can be used to determine which documents are isolated and which documents are shared.

Partition 420, global runtime 430 and partition 440 can include, for example, a Java application for implementing the SOA container in the server container 410. For example, partition 420 can include SOA infrastructure data 421, global runtime 430 can include SOA infrastructure data 431, and partition 440 can include SOA infrastructure data 441. Partition 420 can also include definitions for a Java Message Service (JMS) 423, definitions for J2EE Connector Architecture (JCA) factories 424, and definitions for datasources 425 for a Java Naming and Directory Interface (JNDI) environment. Global runtime 430 can include definitions for JMS 433, definitions for JCA factories 434 and definitions for datasources 435 for a JNDI environment. Partition 440 can also include definitions for JMS 443, definitions for JCA factories 444 and definitions for datasources 445 for a JNDI environment.

The JMS definitions provide a way for Java programs, which make up the SOA container, to access, for example, enterprise messaging systems. JCA factories can include, for example, definitions for JCA adapters. The definitions for the datasources can include definitions for configuring an application, such as a Java application, to point to a particular database.

Adapters adapt data going into and out of applications. Therefore, information can be adapted according to the application that is running. Adapters support a robust, light weight, highly scalable, and standards-based integration framework, which enables disparate applications to communicate with each other. For example, adapters enable you to integrate packaged applications, legacy applications, databases, and Web services.

ICntegration adapters can be plugged into a system in order to communicate with different systems. The adapters provide a unified connectivity architecture, which facilitates integration of information from several on-premise, legacy and cloud based applications and systems into the SOA communication middleware. There are adapters for different web services, legacy systems, input (e.g. main frames), external systems. The adapters facilitate integration and are an extension platform for applications. Some adapters can be preconfigured and some adapters can be customized. The adapters are a component of the SOA middleware container and can be used to communicate with an external system.

The exemplary embodiment has been described with respect to two tenants in the server container 410, however, more than two tenants and more than two partitions can be included in the server container 410. Further, a tenant can have more than one partition. Also, a tenant can have more than one database.

III. Method of Customizing Composite and Using Customized Composite

Figure 5:
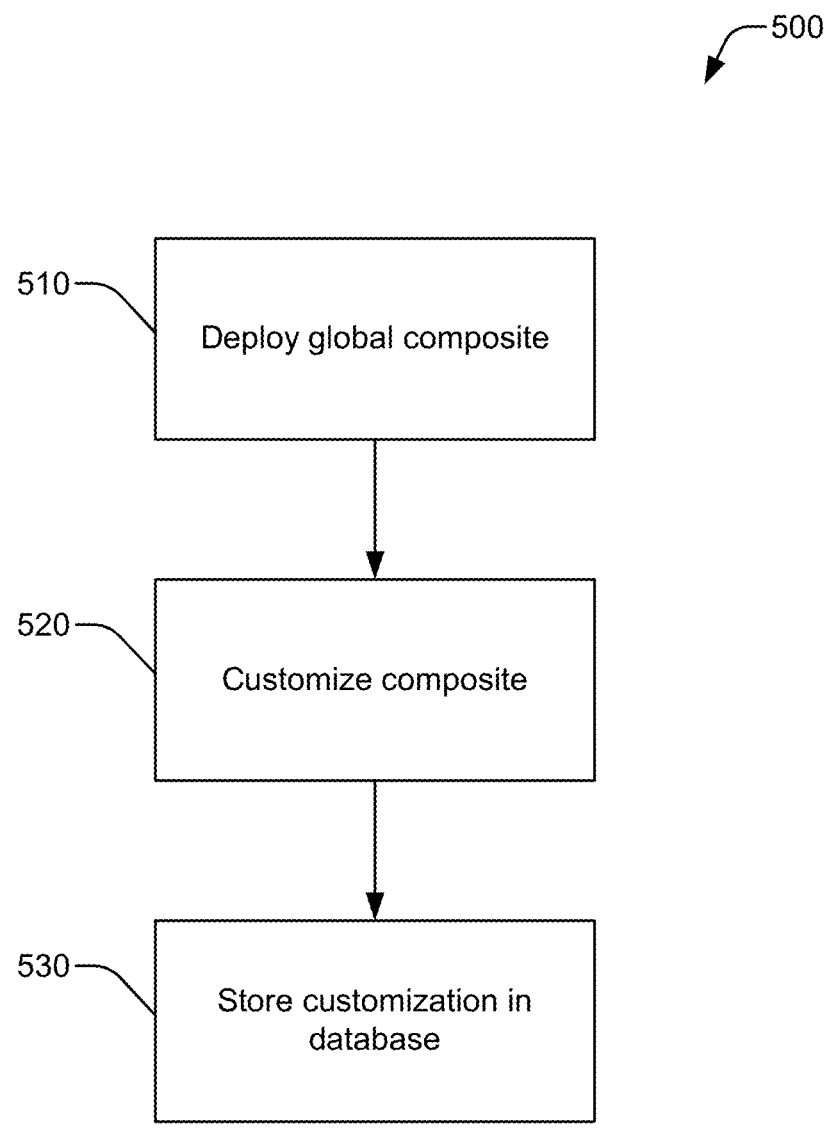
FIG. 5 is a flowchart of a method of customizing a composite, in accordance with some exemplary embodiments.
Figure 6:
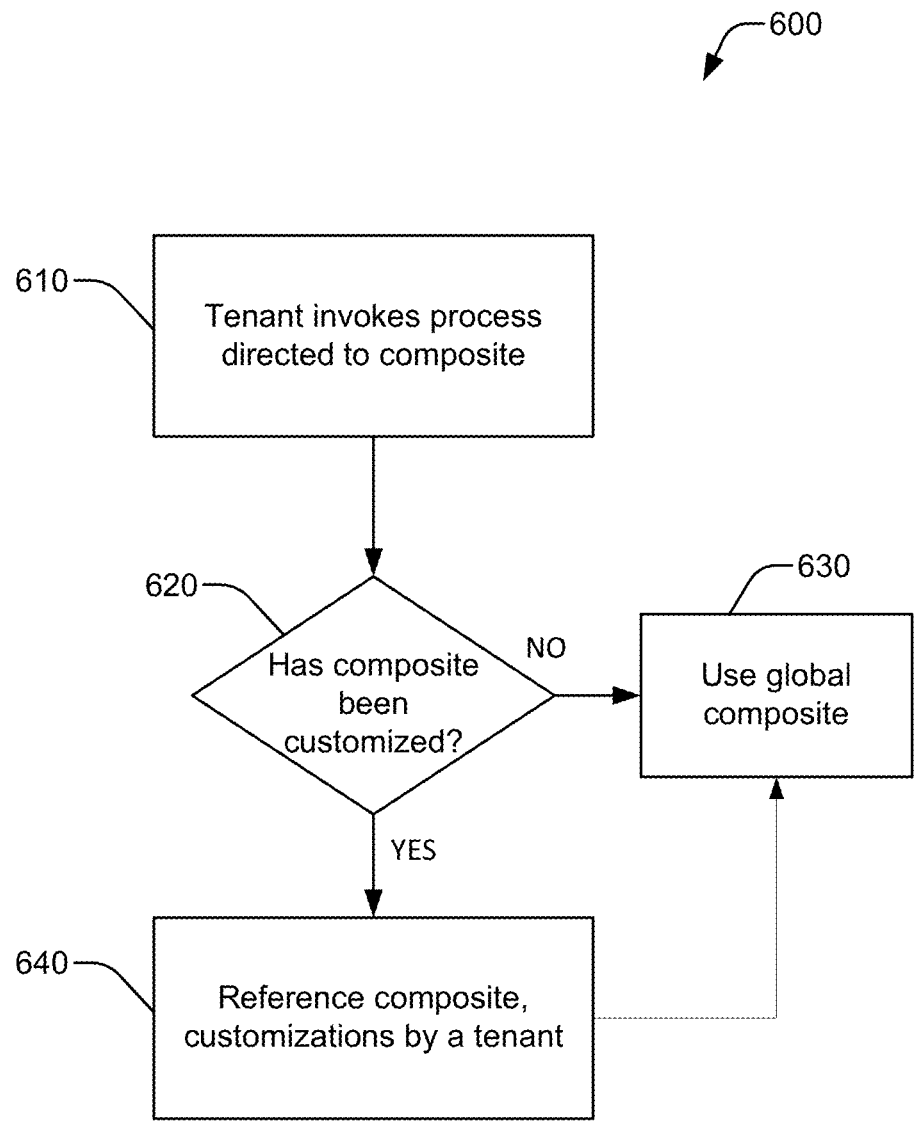
FIG. 6 is a flowchart of a method of using the customized composite, in accordance with some exemplary embodiments.

FIG. 5 is a flowchart of a method of customizing a composite, in accordance with some exemplary embodiments. FIG. 6 is a flowchart of a method of using the customized composite, in accordance with some exemplary embodiments.

FIG. 5 illustrates a method 500 for customizing a global composite in order to create a shared composite. At step 510, the global composite can be deployed in the shared cache of a server container during runtime. The global composite can be deployed by, for example, an administrator of the global runtime. When the server container 410 is running, a global administrator can deploy one or more global composites stored in the global database 460 of the global runtime. The shared cache 432 can reference a global document of the global composite that is stored in the global database 460.

If a tenant wants to customize one or more of the global documents, at step 520, the tenant can obtain one or more global documents of the global composite and customize the metadata of the one or more global documents. For example, the tenant of partition 420 may want to customize a global document according to their particular needs. Therefore, the tenant of partition 420 can obtain the global document 436 that the tenant wants to modify and modify the global document.

After the tenant has customized the metadata of the global document, at step 530, the customizations which the tenant has made to the global document can then be stored in a database of the tenant. For example, if the tenant of partition 420 modifies the global composite 436, the modifications to the global composite 426 can be stored in the tenant's database 450. Therefore, instead of each tenant having their own instance of the global composite, which contains metadata that can be used by different tenants, the global composite is shared. Metadata, which includes customizations of the global composite that are specific to a particular tenant, can be stored in the database of that particular tenant.

FIG. 6 is a flowchart of a method 600 of using the customized composite, in accordance with some exemplary embodiments.

At step 610, when the server container is running, the tenant can invoke a process directed to a composite. The composite application is stored in a database as a form of a system record. When a composite application is deployed in accordance with a particular process, the composite application would enter the cache, which is in a memory during runtime, from the database when the server is started.

At step 620, if the tenant has invoked a process, it is determined whether the tenant has made customizations to the global document directed to the process. If the user has not made any customizations to the global document, then the global document of the global composite is referenced at step 630.

If the tenant has customized the global composite, then at step 640 the customizations to the global document that have been made by the tenant are referenced before referencing the global document at step 630. Therefore, the customizations can be determined before implementing the global document. Further, since the global document is shared between multiple tenants, the data in the global document does not need to be repeated in the partition for each tenant. Also, less data is being duplicated because tenants can share the metadata in the global shared cache.

Since each tenant has a separate partition, multiple tenants can share the server container. Data which is specific to a particular tenant can be stored in a tenant's own database and data which can be shared can be stored in a global database. Further, data which is specific to a particular tenant cannot be seen or accessed by other tenants, whereas the global data can be seen and accessed by one or more tenants of the server container.

Further, the global metadata in the global database can be modified by, for example, an administrator. Also, changes can be made to the global metadata during runtime. For example, global composite patching can be performed during runtime.

The SOA middleware container then interprets the composite application and orchestrates the processes for performing the composite application. BPEL and BPM are high level languages which are used to orchestrate the processes for the composite application. One the program is running, the program performs the orchestration. Specifically, the SOA middleware container orchestrates, for example, business processes.

SOA suite is provided as an example of a middleware container. However, the examples described above are not limited to a particular type or version of a middleware container.

IV. Computer System

Figure 7:
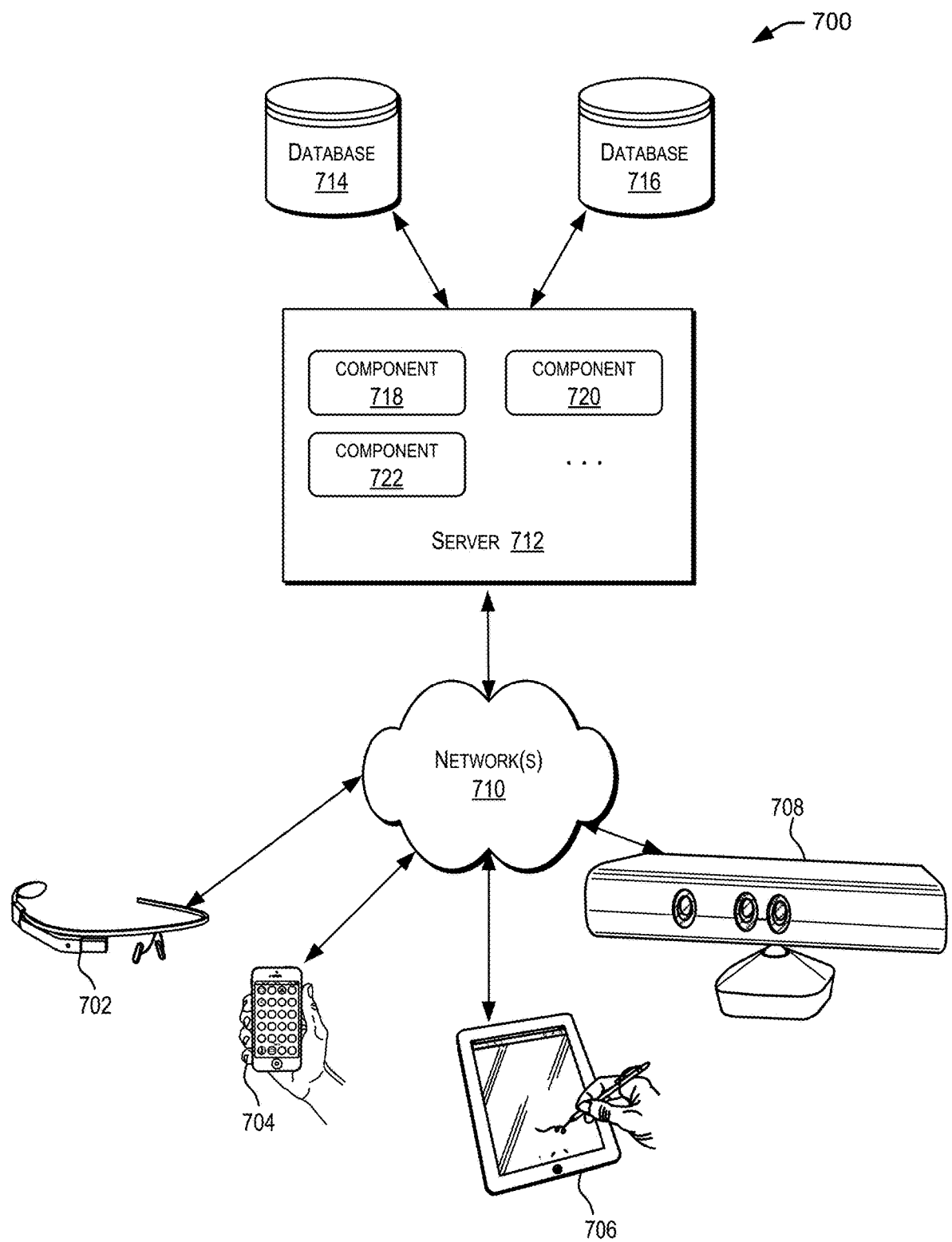
FIG. 7 illustrates a simplified diagram of a distributed system for implementing some exemplary embodiments.

FIG. 7 illustrates a simplified diagram of a distributed system 700 for implementing an exemplary embodiment. In the illustrated exemplary embodiment, the distributed system 700 includes one or more client computing devices 702, 704, 706, and 708, which are configured to execute and operate a client application such as a web browser, proprietary client, or the like over one or more network(s) 710. The server 712 may be communicatively coupled with the remote client computing devices 702, 704, 706, and 708 via network 710.

In various embodiments, the server 712 may be adapted to run one or more services or software applications such as services and applications that provide message delivery services. In certain embodiments, the server 712 may also provide other services or software applications can include non-virtual and virtual environments. In some embodiments, these services may be offered as web-based or cloud services or under a Software as a Service (SaaS) model to the users of the client computing devices 702, 704, 706, and/or 708. Users operating the client computing devices 702, 704, 706, and/or 708 may in turn utilize one or more client applications to interact with the server 712 to utilize the services provided by these components.

In the configuration depicted in FIG. 7, the software components 718, 720 and 722 of system 700 are shown as being implemented on the server 712. In other embodiments, one or more of the components of the system 700 and/or the services provided by these components may also be implemented by one or more of the client computing devices 702, 704, 706, and/or 708. Users operating the client computing devices may then utilize one or more client applications to use the services provided by these components. These components may be implemented in hardware, firmware, software, or combinations thereof. It should be appreciated that various different system configurations are possible, which may be different from distributed system 700. The embodiment shown in FIG. 7 is thus one example of a distributed system for implementing an embodiment system and is not intended to be limiting.

The client computing devices 702, 704, 706, and/or 708 may include various types of computing systems. For example, client device may include portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like. The devices may support various applications such as various Internet-related apps, e-mail, short message service (SMS) applications, and may use various other communication protocols. The client computing devices may also include general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Client computing devices may also include electronic devices such as a thin-client computer, an Internet-enabled gaming system (e.g., a Microsoft Xbox gaming console with or without a Kinect® gesture input device), and/or a personal messaging device, capable of communicating over the network(s) 710.

Although distributed system 700 in FIG. 7 is shown with four client computing devices, any number of client computing devices may be supported. Other devices, such as devices with sensors, etc., may interact with the server 712.

The network(s) 710 in the distributed system 700 may be any type of network familiar to those skilled in the art that can support data communications using any of a variety of available protocols, including without limitation TCP/IP (transmission control protocol/Internet protocol), SNA (systems network architecture), IPX (Internet packet exchange), AppleTalk, and the like. Merely by way of example, the network(s) 710 can be a local area network (LAN), networks based on Ethernet, Token-Ring, a wide-area network, the Internet, a virtual network, a virtual private network (VPN), an intranet, an extranet, a public switched telephone network (PSTN), an infra-red network, a wireless network (e.g., a network operating under any of the Institute of Electrical and Electronics (IEEE) 1002.11 suite of protocols, Bluetooth®, and/or any other wireless protocol), and/or any combination of these and/or other networks.

The server 712 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. The server 712 can include one or more virtual machines running virtual operating systems, or other computing architectures involving virtualization. One or more flexible pools of logical storage devices can be virtualized to maintain virtual storage devices for the server. Virtual networks can be controlled by the server 712 using software defined networking. In various embodiments, the server 712 may be adapted to run one or more services or software applications described in the foregoing disclosure. For example, the server 712 may correspond to a server for performing processing as described above according to an embodiment of the present disclosure.

The server 712 may run an operating system including any of those discussed above, as well as any commercially available server operating system. Server 712 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, the server 712 may include one or more applications to analyze and consolidate data feeds and/or event updates received from users of the client computing devices 702, 704, 706, and 708. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. The server 712 may also include one or more applications to display the data feeds and/or real-time events via one or more display devices of the client computing devices 702, 704, 706, and 708.

The distributed system 700 may also include one or more databases 714 and 716. These databases may provide a mechanism for storing information such as inventory information, and other information used by the example embodiments. Databases 714 and 716 may reside in a variety of locations. By way of example, one or more of databases 714 and 716 may reside on a non-transitory storage medium local to (and/or resident in) the server 712. Alternatively, the databases 714 and 716 may be remote from the server 712 and in communication with the server 712 via a network-based or dedicated connection. In one set of embodiments, the databases 714 and 716 may reside in a storage-area network (SAN). Similarly, any necessary files for performing the functions attributed to the server 712 may be stored locally on the server 712 and/or remotely, as appropriate. In one set of embodiments, the databases 714 and 716 may include relational databases, such as databases provided by Oracle, that are adapted to store, update, and retrieve data in response to SQL-formatted commands.

Figure 8:
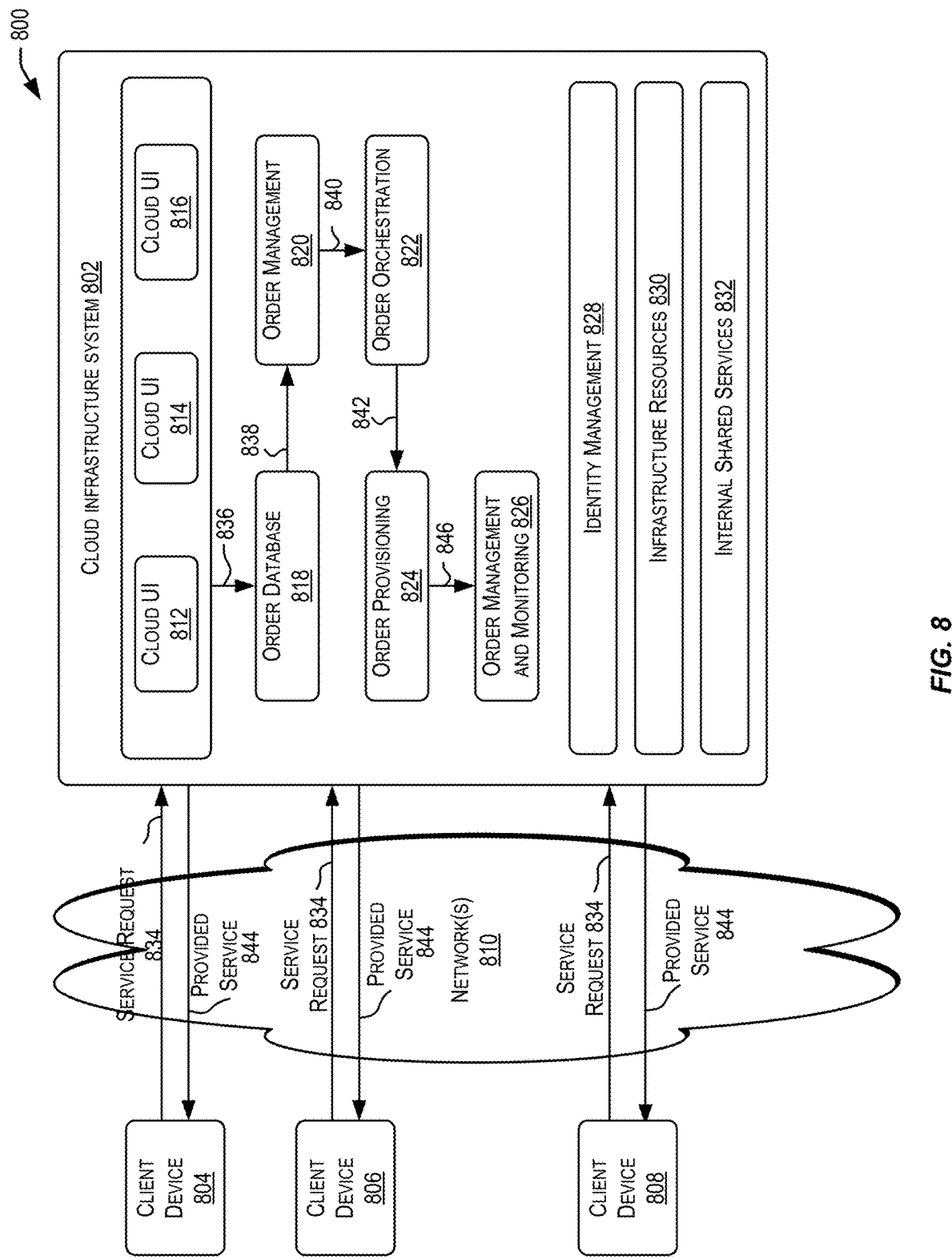
FIG. 8 illustrates a simplified block diagram of one or more elements of a system environment in which services may be offered as cloud services, in accordance with some exemplary embodiments.

In some embodiments, the message delivery services described above may be offered as services via a cloud environment. FIG. 8 illustrates a simplified block diagram of one or more components of a system environment 800 in which services may be offered as cloud services, in accordance with an embodiment of the present disclosure. In the illustrated embodiment in FIG. 8, system environment 800 includes one or more client computing devices 804, 806, and 808 that may be used by users to interact with a cloud infrastructure system 802 that provides cloud services, including services for dynamically modifying documents (e.g., webpages) responsive to usage patterns. Cloud infrastructure system 802 may comprise one or more computers and/or servers.

It should be appreciated that cloud infrastructure system 802 depicted in FIG. 8 may have other components than those depicted. Further, the embodiment shown in FIG. 8 is only one example of a cloud infrastructure system that may incorporate some of the example embodiments. In some other embodiments, cloud infrastructure system 802 may have more or fewer components than shown in the figure, may combine two or more components, or may have a different configuration or arrangement of components.

Client computing devices 804, 806, and 808 may be devices similar to those described above for 702, 704, 706, and 708. Client computing devices 804, 806, and 808 may be configured to operate a client application such as a web browser, a proprietary client application (e.g., Oracle Forms), or some other application, which may be used by a user of the client computing device to interact with cloud infrastructure system 802 to use services provided by cloud infrastructure system 802. Although exemplary system environment 800 is shown with three client computing devices, any number of client computing devices may be supported. Other devices such as devices with sensors, etc. may interact with cloud infrastructure system 802.

Network(s) 810 may facilitate communications and exchange of data between clients 804, 806, and 808 and cloud infrastructure system 802. Each network may be any type of network familiar to those skilled in the art that can support data communications using any of a variety of commercially-available protocols, including those described above for network(s) 710.

In certain embodiments, services provided by cloud infrastructure system 802 may include a host of services that are made available to users of the cloud infrastructure system on demand. In addition to services related to account management, various other services may also be offered including without limitation online data storage and backup solutions, Web-based e-mail services, hosted office suites and document collaboration services, database processing, managed technical support services, and the like. Services provided by the cloud infrastructure system can dynamically scale to meet the needs of its users.

In certain embodiments, a specific instantiation of a service provided by cloud infrastructure system 802 may be referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 802 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

Cloud infrastructure system 802 may also provide "big data" elated computation and analysis services. The term "big data" is generally used to refer to extremely large data sets that can be stored and manipulated by analysts and researchers to visualize large amounts of data, detect trends, and/or otherwise interact with the data. This big data and related applications can be hosted and/or manipulated by an infrastructure system on many levels and at different scales. Tens, hundreds, or thousands of processors linked in parallel can act upon such data in order to present it or simulate external forces on the data or what it represents. These data sets can involve structured data, such as that organized in a database or otherwise according to a structured model, and/or unstructured data (e.g., emails, images, data blobs (binary large objects), web pages, complex event processing). By leveraging an ability of an embodiment to relatively quickly focus more (or fewer) computing resources upon an objective, the cloud infrastructure system may be better available to carry out tasks on large data sets based on demand from a business, government agency, research organization, private individual, group of like-minded individuals or organizations, or other entity.

In various embodiments, cloud infrastructure system 802 may be adapted to automatically provision, manage and track a customer's subscription to services offered by cloud infrastructure system 802. Cloud infrastructure system 802 may provide the cloud services via different deployment models. For example, services may be provided under a public cloud model in which cloud infrastructure system 802 is owned by an organization selling cloud services (e.g., owned by Oracle Corporation) and the services are made available to the general public or different industry enterprises. As another example, services may be provided under a private cloud model in which cloud infrastructure system 802 is operated solely for a single organization and may provide services for one or more entities within the organization. The cloud services may also be provided under a community cloud model in which cloud infrastructure system 802 and the services provided by cloud infrastructure system 802 are shared by several organizations in a related community. The cloud services may also be provided under a hybrid cloud model, which is a combination of two or more different models.

In some embodiments, the services provided by cloud infrastructure system 802 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 802. Cloud infrastructure system 802 then performs processing to provide the services in the customer's subscription order.

In some embodiments, the services provided by cloud infrastructure system 802 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by cloud infrastructure system 802 via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by cloud infrastructure system 802 without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 802 may also include infrastructure resources 830 for providing the resources used to provide various services to customers of the cloud infrastructure system. In one embodiment, infrastructure resources 830 may include pre-integrated and optimized combinations of hardware, such as servers, storage, and networking resources to execute the services provided by the PaaS platform and the SaaS platform, and other resources.

In some embodiments, resources in cloud infrastructure system 802 may be shared by multiple users and dynamically re-allocated per demand. Additionally, resources may be allocated to users in different time zones. For example, cloud infrastructure system 802 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 832 may be provided that are shared by different components or modules of cloud infrastructure system 802 to enable provision of services by cloud infrastructure system 802. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 802 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 802, and the like.

In one embodiment, as depicted in FIG. 8, cloud management functionality may be provided by one or more modules, such as an order management module 820, an order orchestration module 822, an order provisioning module 824, an order management and monitoring module 826, and an identity management module 828. These modules may include or be provided using one or more computers and/or servers, which may be general purpose computers, specialized server computers, server farms, server clusters, or any other appropriate arrangement and/or combination.

In an exemplary operation, at 834, a customer using a client device, such as client device 804, 806 or 808, may interact with cloud infrastructure system 802 by requesting one or more services provided by cloud infrastructure system 802 and placing an order for a subscription for one or more services offered by cloud infrastructure system 802. In certain embodiments, the customer may access a cloud User Interface (UI) such as cloud UI 812, cloud UI 814 and/or cloud UI 816 and place a subscription order via these UIs. The order information received by cloud infrastructure system 802 in response to the customer placing an order may include information identifying the customer and one or more services offered by the cloud infrastructure system 802 that the customer intends to subscribe to.

At 836, the order information received from the customer may be stored in an order database 818. If this is a new order, a new record may be created for the order. In one embodiment, order database 818 can be one of several databases operated by cloud infrastructure system 818 and operated in conjunction with other system elements.

At 838, the order information may be forwarded to an order management module 820 that may be configured to perform billing and accounting functions related to the order, such as verifying the order, and upon verification, booking the order.

At 840, information regarding the order may be communicated to an order orchestration module 822 that is configured to orchestrate the provisioning of services and resources for the order placed by the customer. In some instances, order orchestration module 822 may use the services of order provisioning module 824 for the provisioning. In certain embodiments, order orchestration module 822 enables the management of business processes associated with each order and applies business logic to determine whether an order should proceed to provisioning.

As shown in the embodiment depicted in FIG. 8, at 842, upon receiving an order for a new subscription, order orchestration module 822 sends a request to order provisioning module 824 to allocate resources and configure resources needed to fulfill the subscription order. Order provisioning module 824 enables the allocation of resources for the services ordered by the customer. Order provisioning module 824 provides a level of abstraction between the cloud services provided by cloud infrastructure system 800 and the physical implementation layer that is used to provision the resources for providing the requested services. This enables order orchestration module 824 to be isolated from implementation details, such as whether or not services and resources are actually provisioned on the fly or pre-provisioned and only allocated/assigned upon request.

At 844, once the services and resources are provisioned, a notification may be sent to the subscribing customers indicating that the requested service is now ready for use. In some instance, information (e.g. a link) may be sent to the customer that enables the customer to start using the requested services.

At 846, a customer's subscription order may be managed and tracked by an order management and monitoring module 826. In some instances, order management and monitoring module 826 may be configured to collect usage statistics regarding a customer use of subscribed services. For example, statistics may be collected for the amount of storage used, the amount data transferred, the number of users, and the amount of system up time and system down time, and the like.

In certain embodiments, cloud infrastructure system 800 may include an identity management module 828 that is configured to provide identity services, such as access management and authorization services in cloud infrastructure system 800. In some embodiments, identity management module 828 may control information about customers who wish to utilize the services provided by cloud infrastructure system 802. Such information can include information that authenticates the identities of such customers and information that describes which actions those customers are authorized to perform relative to various system resources (e.g., files, directories, applications, communication ports, memory segments, etc.) Identity management module 828 may also include the management of descriptive information about each customer and about how and by whom that descriptive information can be accessed and modified.

Figure 9:
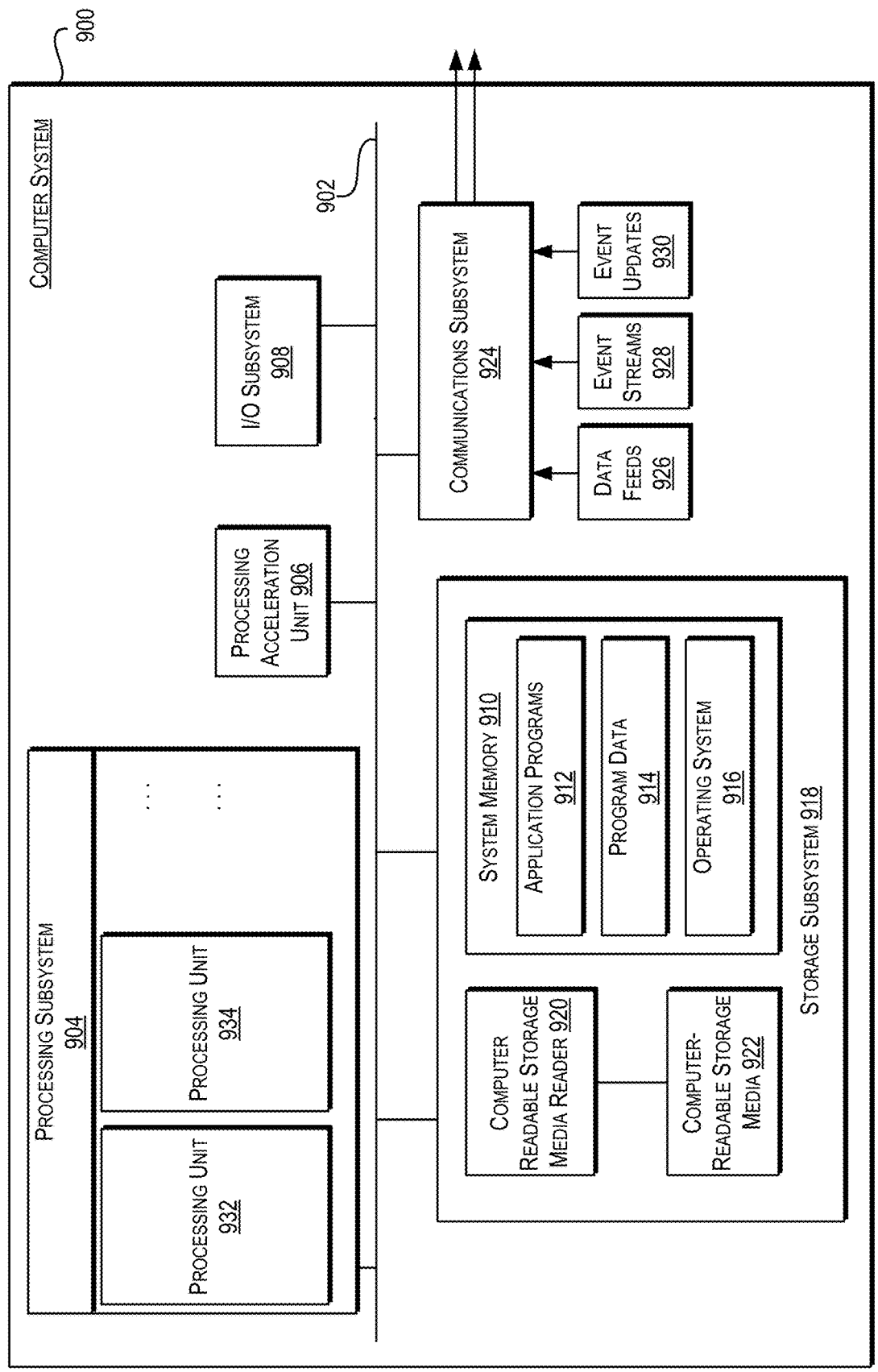
FIG. 9 illustrates an exemplary computer system that may be used to implement certain elements according to some exemplary embodiments.

FIG. 9 illustrates an exemplary computer system 900 that may be used to implement an example embodiment. In some embodiments, computer system 900 may be used to implement any of the various servers and computer systems described above. As shown in FIG. 9, computer system 900 includes various subsystems including a processing subsystem 904 that communicates with a number of peripheral subsystems via a bus subsystem 902. These peripheral subsystems may include a processing acceleration unit 906, an I/O subsystem 908, a storage subsystem 918 and a communications subsystem 924. Storage subsystem 918 may include tangible computer-readable storage media 922 and a system memory 910.

Bus subsystem 902 provides a mechanism for letting the various components and subsystems of computer system 900 communicate with each other as intended. Although bus subsystem 902 is shown schematically as a single bus, alternative embodiments of the bus subsystem may utilize multiple buses. Bus subsystem 902 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard, and the like.

Processing subsystem 904 controls the operation of computer system 900 and may comprise one or more processing units 932, 934, etc. A processing unit may include be one or more processors, including single core or multicore processors, one or more cores of processors, or combinations thereof. In some embodiments, processing subsystem 904 can include one or more special purpose co-processors such as graphics processors, digital signal processors (DSPs), or the like. In some embodiments, some or all of the processing units of processing subsystem 904 can be implemented using customized circuits, such as application specific integrated circuits (ASICs), or field programmable gate arrays (FPGAs).

In some embodiments, the processing units in processing subsystem 904 can execute instructions stored in system memory 910 or on computer readable storage media 922. In various embodiments, the processing units can execute a variety of programs or code instructions and can maintain multiple concurrently executing programs or processes. At any given time, some or all of the program code to be executed can be resident in system memory 910 and/or on computer-readable storage media 910 including potentially on one or more storage devices. Through suitable programming, processing subsystem 904 can provide various functionalities described above for dynamically modifying documents (e.g., webpages) responsive to usage patterns.

In certain embodiments, a processing acceleration unit 906 may be provided for performing customized processing or for off-loading some of the processing performed by processing subsystem 904 so as to accelerate the overall processing performed by computer system 900.

I/O subsystem 908 may include devices and mechanisms for inputting information to computer system 900 and/or for outputting information from or via computer system 900. In general, use of the term "input device" is intended to include all possible types of devices and mechanisms for inputting information to computer system 900. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox® 360 game controller, devices that provide an interface for receiving input using gestures and spoken commands. User interface input devices may also include eye gesture recognition devices such as the Google Glass® blink detector that detects eye activity (e.g., "blinking" while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 900 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Storage subsystem 918 provides a repository or data store for storing information that is used by computer system 900. Storage subsystem 918 provides a tangible non-transitory computer-readable storage medium for storing the basic programming and data constructs that provide the functionality of some embodiments. Software (programs, code modules, instructions) that when executed by processing subsystem 904 provide the functionality described above may be stored in storage subsystem 918. The software may be executed by one or more processing units of processing subsystem 904. Storage subsystem 918 may also provide a repository for storing data used in accordance with the example embodiments.

Storage subsystem 918 may include one or more non-transitory memory devices, including volatile and non-volatile memory devices. As shown in FIG. 9, storage subsystem 918 includes a system memory 910 and a computer-readable storage media 922. System memory 910 may include a number of memories including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within computer system 900, such as during start-up, may typically be stored in the ROM. The RAM typically contains data and/or program modules that are presently being operated and executed by processing subsystem 904. In some implementations, system memory 910 may include multiple different types of memory, such as static random access memory (SRAM) or dynamic random access memory (DRAM).

By way of example, and not limitation, as depicted in FIG. 9, system memory 910 may store application programs 912, which may include client applications, Web browsers, mid-tier applications, relational database management systems (RDBMS), etc., program data 914, and an operating system 916. By way of example, operating system 916 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Computer-readable storage media 922 may store programming and data constructs that provide the functionality of some embodiments. Software (programs, code modules, instructions) that when executed by processing subsystem 904 a processor provide the functionality described above may be stored in storage subsystem 918. By way of example, computer-readable storage media 922 may include non-volatile memory such as a hard disk drive, a magnetic disk drive, an optical disk drive such as a CD ROM, DVD, a Blu-Ray® disk, or other optical media. Computer-readable storage media 922 may include, but is not limited to, Zip® drives, flash memory cards, universal serial bus (USB) flash drives, secure digital (SD) cards, DVD disks, digital video tape, and the like. Computer-readable storage media 922 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. Computer-readable media 922 may provide storage of computer-readable instructions, data structures, program modules, and other data for computer system 900.

In certain embodiments, storage subsystem 918 may also include a computer-readable storage media reader 920 that can further be connected to computer-readable storage media 922. Together and, optionally, in combination with system memory 910, computer-readable storage media 922 may comprehensively represent remote, local, fixed, and/or removable storage devices plus storage media for storing computer-readable information.

In certain embodiments, computer system 900 may provide support for executing one or more virtual machines. Computer system 900 may execute a program such as a hypervisor for facilitating the configuring and managing of the virtual machines. Each virtual machine may be allocated memory, compute (e.g., processors, cores), I/O, and networking resources. Each virtual machine typically runs its own operating system, which may be the same as or different from the operating systems executed by other virtual machines executed by computer system 900. Accordingly, multiple operating systems may potentially be run concurrently by computer system 900. Each virtual machine generally runs independently of the other virtual machines.

Communications subsystem 924 provides an interface to other computer systems and networks. Communications subsystem 924 serves as an interface for receiving data from and transmitting data to other systems from computer system 900. For example, communications subsystem 924 may enable computer system 900 to establish a communication channel to one or more client devices via the Internet for receiving and sending information from and to the client devices.

Communication subsystem 924 may support both wired and/or wireless communication protocols. For example, in certain embodiments, communications subsystem 924 may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 924 can provide wired network connectivity (e.g., Ethernet) in addition to or instead of a wireless interface.

Communication subsystem 924 can receive and transmit data in various forms. For example, in some embodiments, communications subsystem 924 may receive input communication in the form of structured and/or unstructured data feeds 926, event streams 928, event updates 930, and the like. For example, communications subsystem 924 may be configured to receive (or send) data feeds 926 in real-time from users of social media networks and/or other communication services such as Twitter® feeds, Facebook® updates, web feeds such as Rich Site Summary (RSS) feeds, and/or real-time updates from one or more third party information sources.

In certain embodiments, communications subsystem 924 may be configured to receive data in the form of continuous data streams, which may include event streams 928 of real-time events and/or event updates 930, that may be continuous or unbounded in nature with no explicit end. Examples of applications that generate continuous data may include, for example, sensor data applications, financial tickers, network performance measuring tools (e.g. network monitoring and traffic management applications), click-stream analysis tools, automobile traffic monitoring, and the like.

Communications subsystem 924 may also be configured to output the structured and/or unstructured data feeds 926, event streams 928, event updates 930, and the like to one or more databases that may be in communication with one or more streaming data source computers coupled to computer system 900.

Computer system 900 can be one of various types, including a handheld portable device (e.g., an iPhone® cellular phone, an iPad® computing tablet, a PDA), a wearable device (e.g., a Google Glass® head mounted display), a personal computer, a workstation, a mainframe, a kiosk, a server rack, or any other data processing system.

Due to the ever-changing nature of computers and networks, the description of computer system 900 depicted in FIG. 9 is intended only as a specific example. Many other configurations having more or fewer components than the system depicted in FIG. 9 are possible. Based on the disclosure and teachings provided herein, a person of ordinary skill in the art will appreciate other ways and/or methods to implement the various embodiments.

Although example embodiments have been described, various modifications, alterations, alternative constructions, and equivalents are also encompassed within the scope of the example embodiments. Example embodiments are not restricted to operation within certain specific data processing environments, but are free to operate within a plurality of data processing environments. Additionally, although example embodiments have been described using a particular series of transactions and steps, it should be apparent to those skilled in the art that the scope of the example embodiments are not limited to the described series of transactions and steps. Various features and aspects of the above-described embodiments may be used individually or jointly.

Further, while example embodiments have been described using a particular combination of hardware and software, it should be recognized that other combinations of hardware and software are also within the scope of the example embodiments. The example embodiments may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for interprocess communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific example embodiments have been described, these are not intended to be limiting. Various modifications and equivalents are within the scope of the following claims.

What is claimed is:

1. A system comprising:
   a memory and one or more processors;
   a first partition in a multi-tenant server environment of a cloud-based environment comprising a first composite, wherein the first composite comprises first metadata that is configured to be customized for a first tenant of the first partition,
   wherein the multi-tenant server environment is configured to operate a plurality of independent instances of one or more applications for one or more tenants;
   a second partition in the multi-tenant server environment of the cloud-based environment comprising a second composite, wherein the second composite comprises second metadata that is configured to be customized for a second tenant of the second partition; and
   a global runtime in the multi-tenant server environment of the cloud-based environment comprising a global composite, wherein the global composite comprises global metadata that is shared by the first partition for the first tenant and the second partition for the second tenant,
   wherein the global metadata that is shared by the first partition for the first tenant and the second partition for the second tenant is stored in a global database,
   wherein a first portion of the global metadata is modified by the first tenant to create the first metadata, wherein the first metadata comprises the first portion of the global metadata that is customized for the first tenant and is stored in a first database of the first tenant, and wherein a second portion of the global metadata is modified by the second tenant to create the second metadata, wherein the second metadata comprises the second portion of the global metadata that is customized for the second tenant and is stored in a second database of the second tenant,
   wherein the global composite is an integration application comprising an assembly of services, components, and references deployed together in a single application, wherein a component is configured to perform a task for the integration application.

2. The system according to claim 1,
   wherein the first database, the second database and the global database are different from each other.

3. The system according to claim 2, further comprising:
a global memory portion of the global runtime configured to reference the global metadata in the global database,
a first memory portion of the first partition configured to reference the first metadata in the first database and the global metadata in the global database; and
a second memory portion of the second partition configured to reference the second metadata in the second database and the global metadata in the global database.

4. The system according to claim 3, wherein during runtime of a server container of the multi-tenant server environment, if a process of the system is invoked by the first tenant, metadata in the first memory portion is applied before metadata in the global memory portion is applied.

5. The system according to claim 3, wherein during runtime of a server container of the multi-tenant server environment, if a process is invoked by the second tenant, metadata in the second memory portion is applied before metadata in the global memory portion is applied.

6. The system according to claim 1, wherein a component is configured to provide logic used in at least one of the first composite, the second composite and the global composite, wherein a service is configured to provide an entry point to at least one of the first composite, the second composite and the global composite, wherein a reference is configured to link to the service.

7. The system according to claim 6, wherein the component comprises one of business process execution language (BPEL) information, mediator information, business activity monitoring (BAM) information, business rule information, human workflow information and composite application deployment information.

8. The system according to claim 1, wherein the first composite, the second composite and the global composite are service-oriented architecture (SOA) composites.

9. A method comprising:
at a computer system having a processor and a memory:
configuring a first composite of a first partition in a multi-tenant server environment of a cloud-based environment, wherein the first composite comprises first metadata that is configured to be customized for a first tenant of the first partition, wherein the multi-tenant server environment configured to operate a plurality of independent instances of one or more applications for one or more tenants;
configuring a second composite of a second partition in the multi-tenant server environment of the cloud-based environment, wherein the second composite comprises second metadata that is configured to be customized for a second tenant of the second partition; and
configuring a global composite of a global runtime in the multi-tenant server environment of the cloud-based environment, wherein the global composite comprises global metadata that is shared by the first partition for the first tenant and the second partition for the second tenant,
wherein the global metadata that is shared by the first partition for the first tenant and the second partition for the second tenant is stored in a global database,
wherein a first portion of the global metadata is modified by the first tenant to create the first metadata, wherein the first metadata comprises the first portion of the global metadata that is customized for the first tenant and is stored in a first database of the first tenant, and wherein a second portion of the global metadata is modified by the second tenant to create the second metadata, wherein the second metadata comprises the second portion of the global metadata that is customized for the second tenant and is stored in a second database of the second tenant,
wherein the global composite is an integration application comprising an assembly of services, components, and references deployed together in a single application, wherein a component is configured to perform a task for the integration application.

10. The method according to claim 9,
wherein the first database, the second database and the global database are different from each other.

11. The method according to claim 10, further comprising:
configuring a global memory portion of the global runtime to reference the global metadata in the global database,
configuring a first memory portion of the first partition to reference the first metadata in the first database and the global metadata in the global database; and
configuring a second memory portion of the second partition to reference the second metadata in the second database and the global metadata in the global database.

12. The method according to claim 11, wherein during runtime of a server container of the multi-tenant server environment, if a process of the computer system is invoked by the first tenant, metadata in the first memory portion is applied before metadata in the global memory portion is applied.

13. The method according to claim 11, wherein during runtime of a server container of the multi-tenant server environment, if a process is invoked by the second tenant, metadata in the second memory portion is applied before metadata in the global memory portion is applied.

14. The method according to claim 9, wherein the first composite, the second composite and the global composite are service-oriented architecture (SOA) composites.

15. The method according to claim 9, wherein a component comprises one of business process execution language (BPEL) information, mediator information, business activity monitoring (BAM) information, business rule information, human workflow information and composite application deployment information.

16. A non-transitory computer-readable memory comprising a set of instructions stored therein which, when executed by a processor, causes the processor to:
configure a first composite of a first partition in a multi-tenant server environment of a cloud-based environment, wherein the first composite comprises first metadata that is configured to be customized for a first tenant of the first partition, wherein the multi-tenant server environment is configured to operate a plurality of independent instances of one or more applications for one or more tenants;
configure a second composite of a second partition in the multi-tenant server environment of the cloud-based environment comprising, wherein the second composite comprises second metadata that is configured to be customized for a second tenant of the second partition; and
configure a global composite of a global runtime in the multi-tenant server environment of the cloud-based environment comprising, wherein the global composite comprises global metadata that is shared by the first partition of the first tenant and the second partition of the second tenant, wherein the global metadata that is shared by the first partition for the first tenant and the second partition for the second tenant is stored in a global database, wherein a first portion of the global metadata is modified by the first tenant to create the first metadata, wherein the first metadata comprises the first portion of the global metadata that is customized for the first tenant and is stored in a first database of the first tenant, and wherein a second portion of the global metadata is modified by the second tenant to create the second metadata, wherein the second metadata comprises the second portion of the global metadata that is customized for the second tenant and it stored in a second database of the second tenant, wherein the global composite is an integration application comprising an assembly of services, components, and references deployed together in a single application, wherein a component is configured to perform a task for the integration application.

17. The computer-readable memory according to claim 16, wherein the global metadata is modified by the first tenant to create the first metadata and wherein the global metadata is modified by the second tenant to create the second metadata.

* * * * *

UNITED STATES PATENT AND TRADEMARK OFFICE
CERTIFICATE OF CORRECTION

Page 1 of 2

PATENT NO. : 10,909,186 B2
APPLICATION NO. : 15/268387
DATED : February 2, 2021
INVENTOR(S) : DiFranco et al.

It is certified that error appears in the above-identified patent and that said Letters Patent is hereby corrected as shown below:

On the Title Page

Column 2, Item (56) under Other Publications, Line 2, delete "launce" and insert -- launch --, therefor.

Column 2, Item (56) under Other Publications, Line 4, delete "http:/lajax" and insert -- http:/ajax --, therefor.

On page 3, Column 2, Item (56) under Other Publications, Line 21, delete "webtoolkiUoverview." and insert -- webtoolkit/overview. --, therefor.

On page 4, Column 1, Item (56) under Other Publications, Line 7, delete "the bad." and insert -- the bad, --, therefor.

On page 4, Column 1, Item (56) under Other Publications, Line 10, delete "the thebad" and insert -- the-bad --, therefor.

On page 4, Column 2, Item (56) under Other Publications, Line 37, before "56" delete "[[52]]".

On page 4, Column 2, Item (56) under Other Publications, Line 51, delete "expdus-" and insert -- exodus- --, therefor.

On page 4, Column 2, Item (56) under Other Publications, Line 62, delete "abouUnews" and insert -- about/news --, therefor.

In the Specification

In Column 7, Line 61, after "(OWSM)" insert -- , --.

Signed and Sealed this
Thirteenth Day of July, 2021

Drew Hirshfeld
*Performing the Functions and Duties of the
Under Secretary of Commerce for Intellectual Property and
Director of the United States Patent and Trademark Office*

CERTIFICATE OF CORRECTION (continued)
U.S. Pat. No. 10,909,186 B2

In Column 12, Line 56, delete "ICntegration" and insert -- Integration --, therefor.

In Column 14, Line 22, delete "One the" and insert -- Once the --, therefor.